(12) United States Patent
Kodama et al.

(10) Patent No.: US 11,173,753 B2
(45) Date of Patent: Nov. 16, 2021

(54) PNEUMATIC TIRE AND VEHICLE

(71) Applicant: The Yokohama Rubber Co., LTD., Tokyo (JP)

(72) Inventors: Yuji Kodama, Hiratsuka (JP); Yuji Minami, Hiratsuka (JP)

(73) Assignee: The Yokohama Rubber Co., LTD.

( * ) Notice: Subject to any disclaimer, the term of this patent is extended or adjusted under 35 U.S.C. 154(b) by 249 days.

(21) Appl. No.: 15/543,562

(22) PCT Filed: Feb. 19, 2016

(86) PCT No.: PCT/JP2016/054957
§ 371 (c)(1),
(2) Date: Jul. 13, 2017

(87) PCT Pub. No.: WO2016/133215
PCT Pub. Date: Aug. 25, 2016

(65) Prior Publication Data
US 2017/0368891 A1    Dec. 28, 2017

(30) Foreign Application Priority Data

Feb. 20, 2015    (JP) .............................. JP2015-031580

(51) Int. Cl.
*B60C 13/02*    (2006.01)
*B60C 5/00*    (2006.01)
*B60C 13/00*    (2006.01)

(52) U.S. Cl.
CPC .............. *B60C 13/02* (2013.01); *B60C 5/00* (2013.01); *B60C 13/00* (2013.01)

(58) Field of Classification Search
CPC .................................. B60C 13/02; B60C 13/00
(Continued)

(56) References Cited

U.S. PATENT DOCUMENTS

2009/0032161 A1* 2/2009 Yamaguchi ............. B60C 13/02
                                                           152/523
2010/0294412 A1  11/2010 Inoue et al.
(Continued)

FOREIGN PATENT DOCUMENTS

EP    2 974 890         1/2016
GB    2080217 A  *    2/1982    ............. B64C 25/40
(Continued)

OTHER PUBLICATIONS

JP-2006248318-A translated to English through the auto-translate tool of ESpaceNet (Year: 2019) (Year: 2019).*
(Continued)

*Primary Examiner* — Robert C Dye
*Assistant Examiner* — Alexander D Booth
(74) *Attorney, Agent, or Firm* — Thorpe North & Western

(57) ABSTRACT

A pneumatic tire includes a plurality of protrusions that are provided in a range that includes the tire maximum width position of the tire side portion, and that extend in a direction intersecting the radial direction. The plurality of protrusions are separated from each other in the tire circumferential direction by spacings, pass through the center of rotation of the tire, and extend in the tire radial direction. In a case where a first straight line and a second straight line with different tire circumferential direction positions each cross the protrusions, a ratio of a sum of masses per unit length of the protrusions the first straight line crosses to a sum of masses per unit length of the protrusion the second straight line crosses is not less than 0.8 and not greater than 1.2.

27 Claims, 23 Drawing Sheets

(58) Field of Classification Search
USPC .......................................... 244/103; 152/153
See application file for complete search history.

(56) References Cited

U.S. PATENT DOCUMENTS

| | | | |
|---|---|---|---|
| 2011/0088826 A1* | 4/2011 | Watanabe | ............... B60C 13/02 |
| | | | 152/523 |
| 2013/0014877 A1 | 1/2013 | Ahn et al. | |
| 2015/0165831 A1 | 6/2015 | Kodama et al. | |
| 2015/0266347 A1* | 9/2015 | Kodama | ................ B60C 13/02 |
| | | | 152/523 |
| 2016/0016442 A1 | 1/2016 | Mori | |

FOREIGN PATENT DOCUMENTS

| | | | | |
|---|---|---|---|---|
| JP | 2001-039129 | | 2/2001 | |
| JP | 2001039129 A | * | 2/2001 | |
| JP | 2001-206024 | | 7/2001 | |
| JP | 2006248318 A | * | 9/2006 | ............. B60C 13/02 |
| JP | 2009-160994 | | 7/2009 | |
| JP | 2009160994 A | * | 7/2009 | |
| JP | 2013-018474 | | 1/2013 | |
| JP | 2013-060181 | | 4/2013 | |
| JP | 2014-080099 | | 5/2014 | |
| WO | WO-2009017167 A1 | * | 2/2009 | ............. B60C 13/02 |
| WO | WO 2009/084634 | | 7/2009 | |
| WO | WO 2014/024587 | | 2/2014 | |
| WO | WO 2014/061311 | | 4/2014 | |

OTHER PUBLICATIONS

JP-2001039129-A translated to English through the auto-translate tool of ESpaceNet (Year: 2019) (Year: 2019).*
JP-2009160994-A translated to English through the auto-translate tool of ESpaceNet (Year: 2019) (Year: 2019).*
International Search Report for International Application No. PCT/JP2016/054957 dated May 17, 2016, 5 pages, Japan.

* cited by examiner

PNEUMATIC TIRE AND VEHICLE

TECHNICAL FIELD

The present technology relates to a pneumatic tire and a vehicle.

BACKGROUND ART

Japanese Unexamined Patent Application Publication No. 2013-018474A describes a pneumatic tire in which protrusions are provided on a tire side portion. This technology seeks to reduce air density between the floor of the vehicle and the road surface and to generate down force by providing the protrusions on the tire side portion. Down force is a force that presses the vehicle toward the road surface.

According to the pneumatic tire described in Japanese Unexamined Patent Application Publication No. 2013-018474A, down force can be generated. However, uniformity cannot be maintained in a good manner with the pneumatic tire described in Japanese Unexamined Patent Application Publication No. 2013-018474A.

SUMMARY

The present technology provides a pneumatic tire and a vehicle whereby down force can be enhanced and, also, uniformity can be maintained in a good manner.

A pneumatic tire according to an aspect of the present technology includes a plurality of protrusions provided in a range that includes a tire maximum width position of a tire side portion, the plurality of protrusions extending in a direction intersecting a tire radial direction. In such a pneumatic tire, the plurality of protrusions are provided separated from each other in a tire circumferential direction by spacings. Additionally, in a case where a first straight line and a second straight line that pass through a tire rotational center, extend in the tire radial direction, and have different tire circumferential direction positions each cross at least one of the plurality of protrusions, a first protrusion being at least one protrusion, among the plurality of protrusions, the first straight line crosses, and a second protrusion being at least one protrusion, among the plurality of protrusions, the second straight line crosses, a ratio of a sum of mass(es) per unit length of the first protrusion to a sum of mass(es) per unit length of the second protrusion is not less than 0.8 and not greater than 1.2.

A pneumatic tire according to an aspect of the present technology may have a configuration including a plurality of protrusions provided in a range that includes a tire maximum width position of a tire side portion, the plurality of protrusions extending in a direction intersecting a tire radial direction. In such a pneumatic tire, the plurality of protrusions are provided separated from each other in a tire circumferential direction by spacings; and a variation amount in the tire circumferential direction of a mass of the protrusions per 1 degree in the tire circumferential direction is not greater than 0.2 g/degree.

A pneumatic tire according to another aspect of the present technology may have a configuration including a plurality of protrusions provided in a range that includes a tire maximum width position of a tire side portion, the plurality of protrusions extending in a direction intersecting a tire radial direction. In such a pneumatic tire, the plurality of protrusions are provided separated from each other in a tire circumferential direction by spacings. Additionally, in a case where a first straight line and a second straight line that pass through a tire rotational center, extend in the tire radial direction, and have different tire circumferential direction positions each cross at least one of the plurality of the protrusions, a first protrusion being at least one protrusion, among the plurality of the protrusions, the first straight line crosses, and a second protrusion being at least one protrusion, among the plurality of the protrusions, the second straight line crosses, a ratio of a sum of area(s) of cross section(s) along the first straight line of the first protrusion to a sum of area(s) of cross section(s) along the second straight line of the second protrusion is not less than 0.8 and not greater than 1.2.

A configuration is possible in which the first straight line crosses no less than two of the protrusions; and the second straight line crosses a singular number of the protrusions.

Additionally, a configuration is possible in which a height of a central portion of the protrusions is greater than a height of both end portions of the protrusions.

Additionally, a configuration is possible in which a width of a central portion of the protrusions is greater than a width of both end portions of the protrusions.

Additionally, a configuration is possible in which the protrusions pass through the tire maximum width position.

Additionally, a configuration is possible in which at least one of the plurality of protrusions includes a groove.

Additionally, a configuration is desirable in which a depth of the groove is not less than 5% and not greater than 80% of a height of a portion of the protrusion where the groove is provided.

Additionally, a configuration is desirable in which the protrusions are provided on the tire side portion on an outer side of a vehicle on which a tire is to be mounted.

Additionally, a configuration is possible in which at least one of the plurality of protrusions includes a dimple.

Additionally, a configuration is possible in which the spacings in the tire circumferential direction between the protrusions are not uniform.

Additionally, a configuration is possible in which a vehicle inner side/outer side orientation when mounted on a vehicle is designated; and the protrusions are formed on at least the tire side portion that becomes the vehicle outer side.

A vehicle according to an aspect of the present technology is provided with any of the pneumatic tires described above.

With the pneumatic tire and the vehicle according to the present technology, down force can be increased and, also, uniformity can be maintained in a good manner.

DETAILED DESCRIPTION

Embodiments according to the present technology will be described with reference to the drawings. However, the present technology is not limited to these embodiments. The constituents of the embodiments described below can be combined with one another as appropriate. In addition, there are also cases where some of the constituents are not used.

The constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
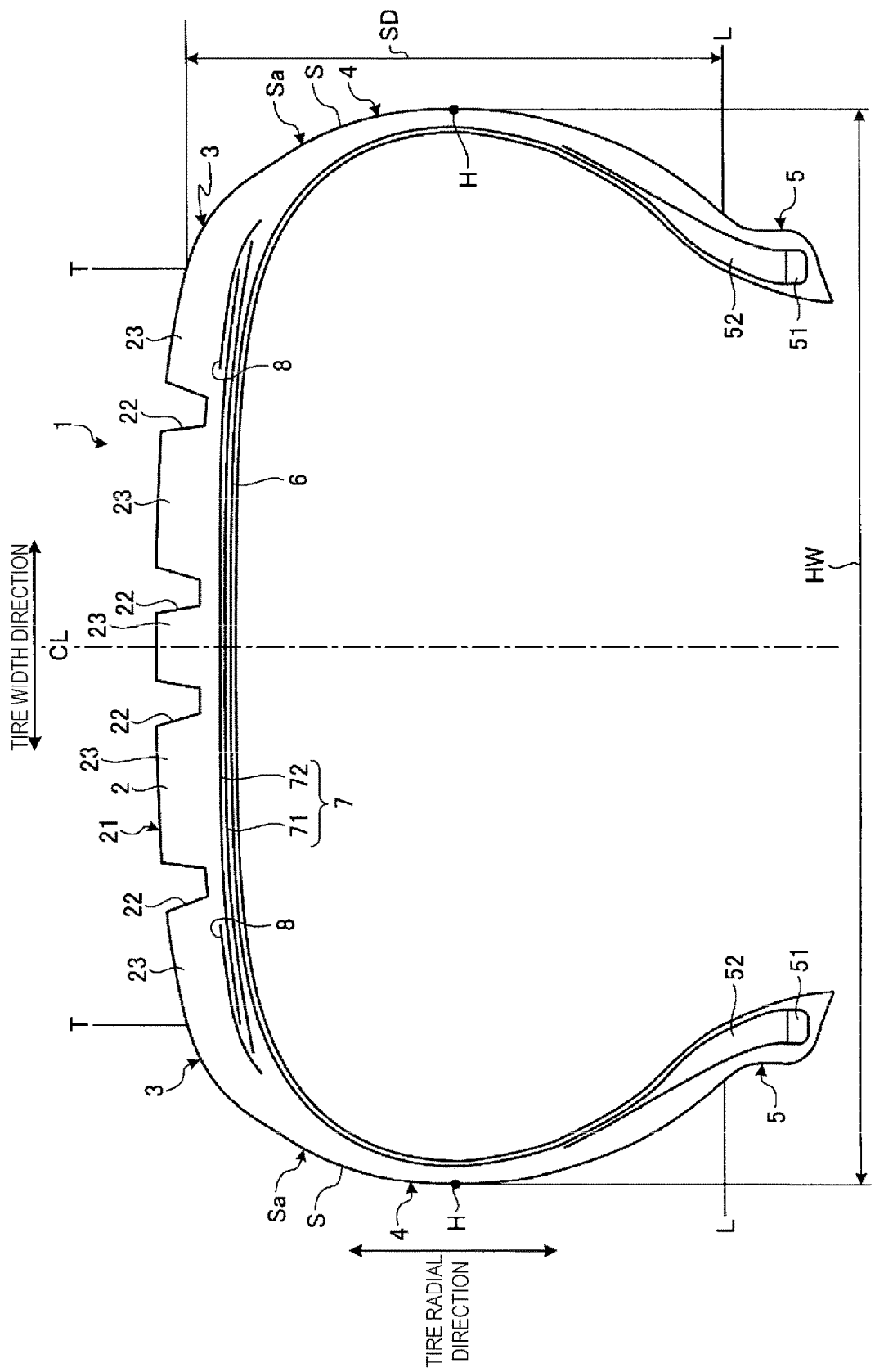
FIG. 1 is a meridian cross-sectional view of a pneumatic tire according to an embodiment of the present technology.

FIG. 1 is a meridian cross-sectional view of a pneumatic tire 1 according to the embodiment. In the following description, "tire radial direction" refers to a direction orthogonal to a rotation axis (not illustrated) of a pneumatic tire 1. "Inner side in the tire radial direction" refers to a side approaching the rotation axis in the tire radial direction, and "outer side in the tire radial direction" refers to a side distanced from the rotation axis in the tire radial direction. "Tire circumferential direction" refers to a circumferential direction for which the rotation axis is a center axis. In addition, "tire width direction" refers to the direction parallel with the rotational axis. "Inward in the tire width direction" refers to the direction toward a tire equatorial plane CL (tire equatorial line) in the tire width direction, and "outward in the tire width direction" refers to the direction away from the tire equatorial plane CL in the tire width direction. "Tire equatorial plane CL" refers to a plane that is orthogonal to the rotation axis of the pneumatic tire 1 and that passes through the center of the pneumatic tire 1 in the tire width direction. "Tire width" is a width in the tire width direction between components located outward in the tire width direction, or in other words, the distance between the components that are most distant from the tire equatorial plane CL in the tire width direction. "Tire equatorial line" refers to a line along the tire circumferential direction of the pneumatic tire 1 that lies on the tire equatorial plane CL. In the present embodiment, the tire equator line and the tire equatorial plane are denoted by the same reference sign CL.

The pneumatic tire 1 of this embodiment is primarily used on passenger vehicles and, as illustrated in FIG. 1, includes a tread portion 2, shoulder portions 3 on both sides of the tread portion 2. The pneumatic tire 1 further includes sidewall portions 4 and bead portions 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and the surface thereof constitutes the outline profile of the pneumatic tire 1. A tread surface 21 is formed on an outer peripheral surface of the tread portion 2, in other words, on a road contact surface that comes into contact with a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the tire circumferential direction and parallel with the tire equator line CL is formed in the tread surface 21 by the plurality of main grooves 22. Additionally, while not illustrated, lug grooves that intersect with the main grooves 22 in each of the land portions 23 are provided in the tread surface 21. The land portions 23 are divided into a plurality of segments in the tire circumferential direction by the lug grooves. Additionally, the lug grooves are formed so as to open, at an outermost side in the tire width direction, toward the outer side in the tire width direction. Note that the lug grooves may have a form that communicates with the main grooves 22 or may have a form that does not communicate with the main grooves 22.

The shoulder portions 3 are regions, of the tread portion 2, located outward in the tire width direction. Additionally, the sidewall portions 4 are exposed on the outermost sides of the pneumatic tire 1 in the tire width direction. The bead portions 5 each include a bead core 51 and a bead filler 52. The bead core 51 is formed by a bead wire, which is a steel wire, wound into an annular shape. The bead filler 52 is a rubber material that is disposed in a space formed by an end of the carcass layer 6 in the tire width direction folded back at the position of the bead core 51.

The end portions of the carcass layer 6 in the tire width direction are respectively folded over the pair of bead cores 51 from inward to outward in the tire width direction, and the carcass layer 6 is stretched in a toroidal shape in the tire circumferential direction to form the framework of the tire. The carcass layer 6 is constituted by a plurality of carcass cords (not illustrated) which are disposed so as to be along a tire meridian direction and to be parallel with each other at a given angle with respect to the tire circumferential direction and which are covered by a coating rubber. The carcass cords are made of organic fibers (e.g., polyester, rayon, nylon, or the like). The carcass layer 6 includes at least one layer.

The belt layer 7 has a multi-layer structure in which at least two layers (belts 71 and 72) are layered. In the tread portion 2, the belt layer 7 is disposed outward of the carcass layer 6 in the tire radial direction, i.e., on the outer periphery of the carcass layer and covers the carcass layer 6 in the tire circumferential direction. The belts 71 and 72 each include a plurality of cords (not illustrated) disposed side-by-side at a predetermined angle with respect to the tire circumferential direction (for example, from 20 degrees to 30 degrees). These cords are covered with coating rubber. The cords are made of steel or organic fibers (polyester, rayon, nylon, or the like). Additionally, the belts 71 and 72 overlap each other and are disposed so that the cords of the respective belts intersect each other.

The belt reinforcing layer 8 is disposed outward of the belt layer 7 in the tire radial direction, i.e., on the outer periphery of the belt layer 7 and covers the belt layer 7 in the tire circumferential direction. The belt reinforcing layer 8 is constituted by a plurality of cords (not illustrated), disposed in alignment in the tire width direction substantially parallel (±5 degrees) to the tire circumferential direction, which are covered by a coating rubber. The cords are made of steel or organic fibers (polyester, rayon, nylon, or the like). The belt reinforcing layer 8 illustrated in FIG. 1 is disposed so as to cover end portions of the belt layer 7 in the tire width direction. The configuration of the belt reinforcing layer 8 is not limited to that described above. Although not illustrated, a configuration is possible in which the belt reinforcing layer 8 is disposed so as to cover the entirety of the belt layer 7. Alternatively, for example, a configuration is possible that includes two reinforcing layers, where the belt reinforcing layer 8 is formed so that the reinforcing layer on the inner side in the tire radial direction is longer in the tire width direction than the belt layer 7 and is disposed so as to cover the entirety of the belt layer 7, and the reinforcing layer on the outer side in the tire radial direction is disposed so as only to cover the end portions of the belt layer 7 in the tire width direction. Alternatively, for example, a configuration is possible that includes two reinforcing layers, where each of the reinforcing layers is disposed so as only to cover the end portions of the belt layer 7 in the tire width direction. In other words, the belt reinforcing layer 8 is configured so as to overlap at least the end portion of the belt layer 7 in the tire width direction. Additionally, the belt reinforcing layer 8 is constituted of a band-like strip material (having, for example, a width of 10 mm) wound in the tire circumferential direction.

In the following description, "total width" is the spacing between the sidewalls 4 including designs on the sidewalls 4 (patterns, characters, or the like on the tire side surface) when the pneumatic tire 1 is mounted on a regular rim, inflated to a regular internal pressure (e.g. 230 kPa), and in an unloaded state. Note that the internal pressure of 230 kPa as described above is selected for specifying the dimensions of the pneumatic tire such as the total width and the like. All the parameters of the tire dimensions stated in this Specification are specified under an internal pressure of 230 kPa and in the unloaded state. However, it should be understood that inflating to an internal pressure of 230 kPa is not necessary for the application of the present technology, and the pneumatic tire 1 according to the present technology inflated to an internal pressure in the typically used range exhibits the advantageous effects of the present technology.

Additionally, "tire side section S" refers to, in FIG. 1, the outer side in the tire width direction from a ground contact edge T of the tread portion 2 or, in other words, a surface that uniformly continues in a range of the outer side in the tire radial direction from a rim check line L. Additionally, "ground contact edge T" refers to both outermost edges in the tire width direction of a region in which the tread surface 21 of the tread portion 2 of the pneumatic tire 1 contacts the road surface with the pneumatic tire 1 mounted on a regular rim, inflated to the regular internal pressure, and loaded with 70% of the regular load. The ground contact edge T is continuous in the tire circumferential direction. Moreover, "rim check line L" refers to a line used to confirm whether the tire has been mounted on the rim correctly and, typically, is an annular convex line closer to the outer side in the tire radial direction than a rim flange and continues in the tire circumferential direction along a portion adjacent to the rim flange on a front side surface of the bead portions 5.

As illustrated in FIG. 1, tire maximum width positions H are positions of the edges of the tire cross-sectional width HW where the width in the tire width direction is greatest. "Tire cross-sectional width HW" is the maximum total tire width in the tire width direction excluding any designs (patterns, characters, or the like on the tire side surface) on the sidewalls 4, when the pneumatic tire 1 is mounted on a regular rim, inflated to the regular internal pressure, and in an unloaded state. In tires provided with a rim protection bar (provided along the tire circumferential direction and projecting outward in the tire width direction) that protects the rim, the rim protection bar is the most outward portion in the tire width direction, but the tire cross-sectional width HW as defined in this embodiment excludes the rim protection bar.

Here, "regular rim" refers to "standard rim" defined by the Japan Automobile Tyre Manufacturers Association Inc. (JATMA), "Design Rim" defined by the Tire and Rim Association, Inc. (TRA), or "Measuring Rim" defined by the European Tyre and Rim Technical Organisation (ETRTO). In addition, "regular internal pressure" refers to "maximum air pressure" defined by JATMA, a maximum value in "tire load limits at various cold inflation pressures" defined by TRA, and "inflation pressures" defined by ETRTO. "Regular load" refers a "maximum load capacity" as defined by JATMA, the maximum value in "TIRE LOAD LIMITS AT VARIOUS COLD INFLATION PRESSURES" as defined by TRA, or "load capacity" as defined by ETRTO.

Here, "tire maximum width position H" is the position where a width of the pneumatic tire 1 in the tire width direction is greatest, when the pneumatic tire 1 is mounted on a regular rim, inflated to the regular internal pressure, and in an unloaded state.

Protrusions

The pneumatic tire 1 of the present embodiment includes protrusions 9 provided protruding from a profile of a surface of a tire side portion S, namely a tire side surface Sa, outward from the tire. The protrusions 9 are provided on the tire side portion S in a range SD that includes the tire maximum width position H.

Figure 2A:
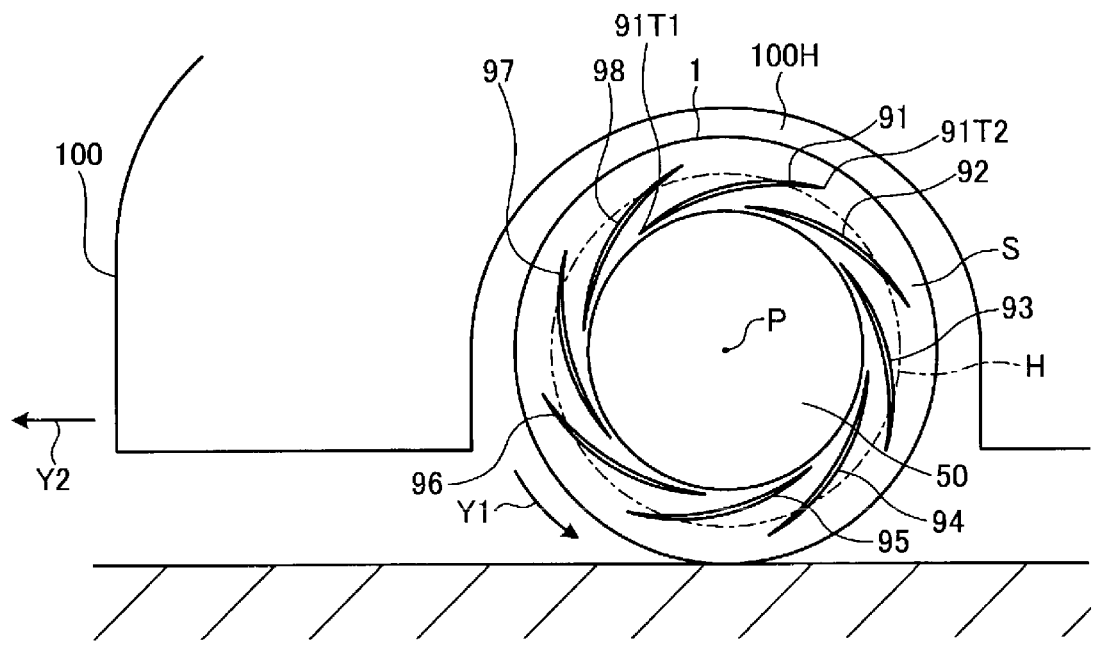
FIG. 2A is a drawing illustrating an example of a pneumatic tire on which protrusions are provided.
Figure 2B:
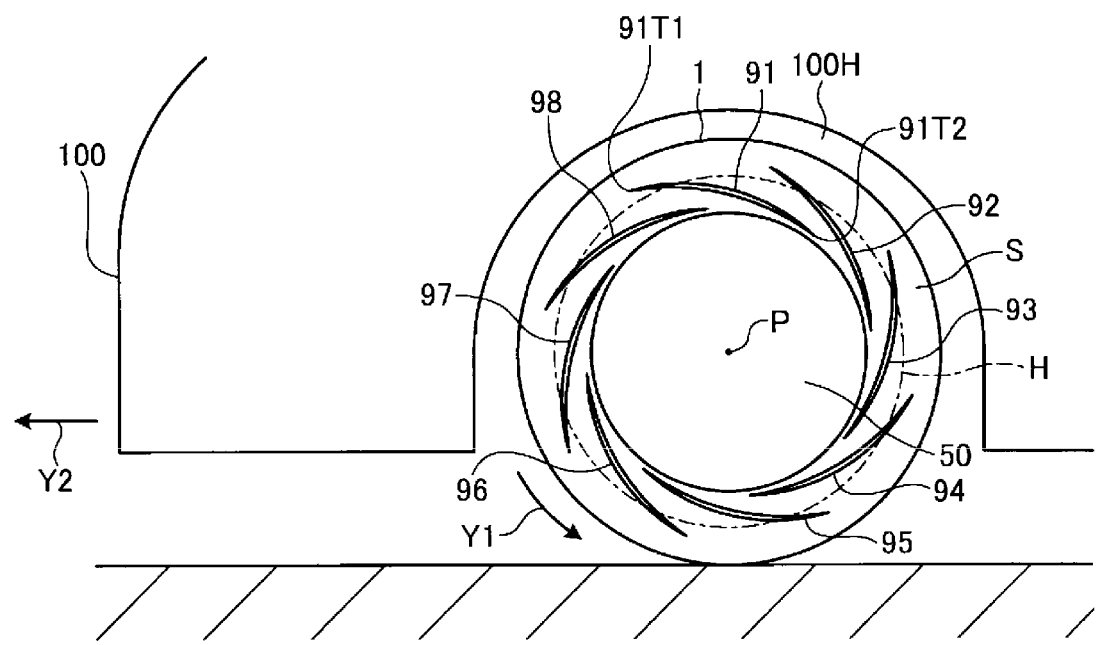
FIG. 2B is a drawing illustrating an example of a pneumatic tire on which protrusions are provided.

FIGS. 2A and 2B are drawings illustrating examples of pneumatic tires on which the protrusions 9 are provided in the range SD of FIG. 1. FIG. 2A illustrates an example in which the pneumatic tire 1 is mounted on a vehicle 100. As illustrated in FIG. 2A, the pneumatic tire 1 is mounted inside a tire house 100H of the vehicle 100. The advancement direction of the vehicle 100 is the direction indicated by arrow Y2 in cases where the rotation direction of the pneumatic tire 1 is the direction indicated by arrow Y1.

The pneumatic tire 1 includes a plurality of protrusions 91, 92, 93, 94, 95, 96, 97, and 98 on the tire side portion S. In this example, spacings between the plurality of protrusions 91, 92, 93, 94, 95, 96, 97, and 98 are uniform, that is, equidistant. Moreover, in this example, the plurality of protrusions 91, 92, 93, 94, 95, 96, 97, and 98 pass through the tire maximum width position H.

The protrusion 91 is provided on the tire side portion S on the outer side of the vehicle 100 on which the tire is mounted. From the perspective of the center of rotation (rotation axis) P of the pneumatic tire 1, the protrusion 91 includes an end portion 91T1 in the counter-clockwise direction and an end portion 91T2 in the clockwise direction on the tire side portion S on the outer side of the vehicle 100. The end portion 91T1 of the protrusion 91 is positioned farther inward in the tire radial direction than the end portion 91T2. As such, the protrusion 91 extends in a direction that intersects the tire radial direction. Note that, as illustrated in FIG. 2B, a reverse configuration is possible in which the end portion 91T2 is positioned farther inward in the tire radial direction than the end portion 91T1. Additionally, the convex side of the arc may face the center of rotation P of the pneumatic tire 1.

When viewed from the outer side of the vehicle 100 in a direction along the center of rotation (rotation axis) P of the pneumatic tire 1, the protrusion 91 has an arc shape, and the concave side of the arc faces the center of rotation P of the pneumatic tire 1.

The other protrusions 92, 93, 94, 95, 96, 97, and 98 have the same configuration as the protrusion 91. Note that, in the following description, the protrusions 91, 92, 93, 94, 95, 96, 97, and 98 may be referred to collectively as the "protrusion 9".

Advantageous Effects of the Protrusions

Figure 3A:
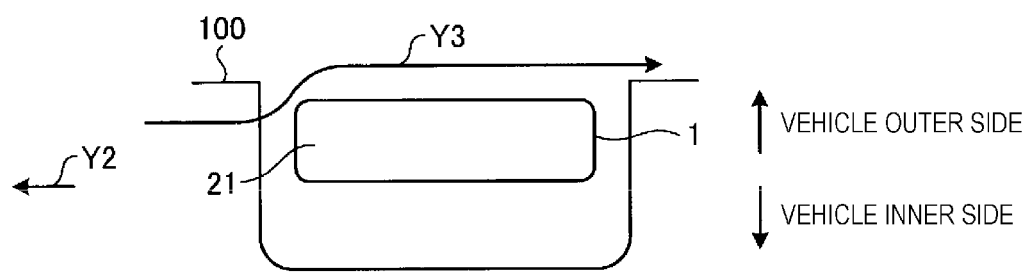
FIG. 3A is a drawing illustrating the flow of air around a tire including a tire side portion on which protrusions are not provided.
Figure 3B:
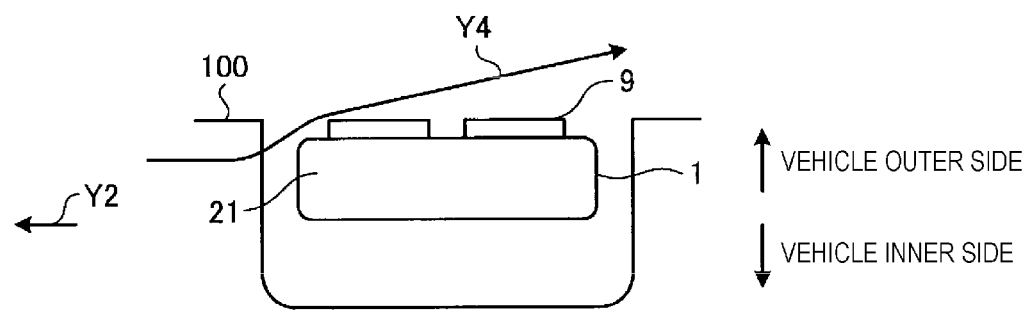
FIG. 3B is a drawing illustrating the flow of air around a tire that includes a tire side portion on which protrusions are provided.

FIGS. 3A and 3B are drawing explaining the advantageous effects obtained by providing the protrusions. FIG. 3A is a drawing illustrating the flow of air around a tire including a tire side portion S on which protrusions are not provided. FIG. 3B is a drawing illustrating the flow of air around a tire including the tire side portion S on which the protrusions are provided. Note that FIGS. 3A and 3B illustrate views looking up from the road surface at the tread surface 21 of the pneumatic tire 1.

As illustrated in FIG. 3A, in cases where the protrusions are not provided on the side portion S of the pneumatic tire 1, the flow of air indicated by arrow Y3 with respect to arrow Y2, namely the advancement direction of the vehicle 100, is substantially parallel with a surface (not illustrated in the drawings) orthogonal to the center of rotation (rotation axis) P of the pneumatic tire 1.

In contrast, as illustrated in FIG. 3B, in cases where the protrusions 9 are provided on the side portion S of the pneumatic tire 1, the flow of air indicated by arrow Y4 with respect to arrow Y2, namely the advancement direction of the vehicle 100, is in a direction away from a surface (not illustrated in the drawings) orthogonal to the center of rotation (rotation axis) P of the pneumatic tire 1, that is, is in a direction away from the vehicle 100. As such, the density of the air between the floor of the vehicle 100 and the road surface decreases. As a result, down force is generated. The effects of the down force contribute to, for example, the enhancement of the steering stability performance of the vehicle 100.

The protrusions 9 are disposed on at least one of the tire side portions S. If the pneumatic tire 1 is mounted on the vehicle 100 in a state where the tire side portion S on which the protrusions 9 are provided faces the vehicle outer side, the flow of air across the tire side portion S on the vehicle outer side can be pushed to the vehicle outer side, and down force can be increased. Moreover, by making the shape of the protrusions 9 appropriate, down force can be increased and, also, the uniformity of the pneumatic tire 1 can be maintained in a good manner. Hereinafter, descriptions are given of arrangements and shapes of the protrusions 9 for increasing down force and, also, maintaining the uniformity of the pneumatic tire 1 in a good manner.

Arrangement of the Protrusions

Figure 4:
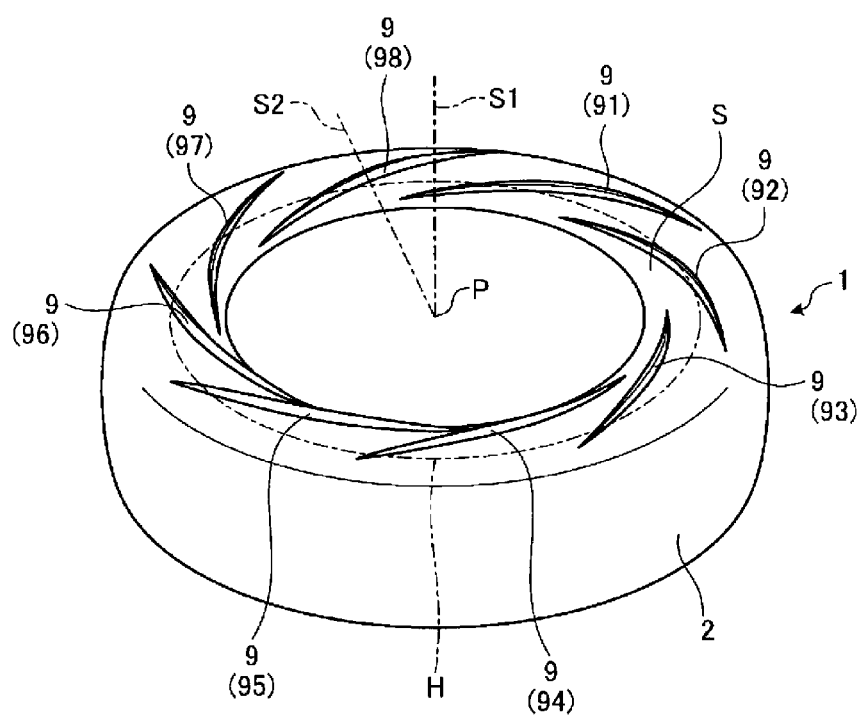
FIG. 4 is a drawing illustrating an example of an arrangement of the protrusions on the tire side portion.

FIG. 4 is a drawing illustrating an example of an arrangement of the protrusions 9 on the tire side portion S. FIGS. 5A to 5D are drawings explaining the mass per unit length and the areas of cross sections of the protrusions 9.

As illustrated in FIG. 4, a first straight line S1 and a second straight line S2 are contrived. The first straight line S1 and the second straight line S2 pass through the center of rotation P of the tire and extend in the tire radial direction. Positions in the tire circumferential direction of the first straight line S1 and the second straight line S2 differ from each other.

The first straight line S1 crosses the protrusion 91. Additionally, the first straight line S1 crosses the protrusion 98. The position where the first straight line S1 crosses the protrusion 91 and the position where the first straight line S1 crosses the protrusion 98 differ from each other in the tire radial direction. The second straight line S2 crosses the protrusion 98. The second straight line S2 does not cross the protrusion 91. That is, in this example, the first straight line S1 crosses at least the two protrusions 91 and 98 and the second straight line S2 crosses the single protrusion 98.

Here, the two protrusions 91 and 98 overlap in the radial direction along the first straight line S1. The protrusion 98 does not overlap with the other protrusions in the radial direction along the second straight line S2.

Mass of the Protrusions

In cases where the relationship between the first straight line S1 and the second straight line S2 and the protrusions 9 is as described above, a ratio of a sum of masses per unit length of the protrusions 9 the first straight line S1 crosses to a sum of masses per unit length of the protrusions 9 the second straight line S2 crosses is not less than 0.8 and not greater than 1.2 (that is, is a value close to 1).

Figure 5A:
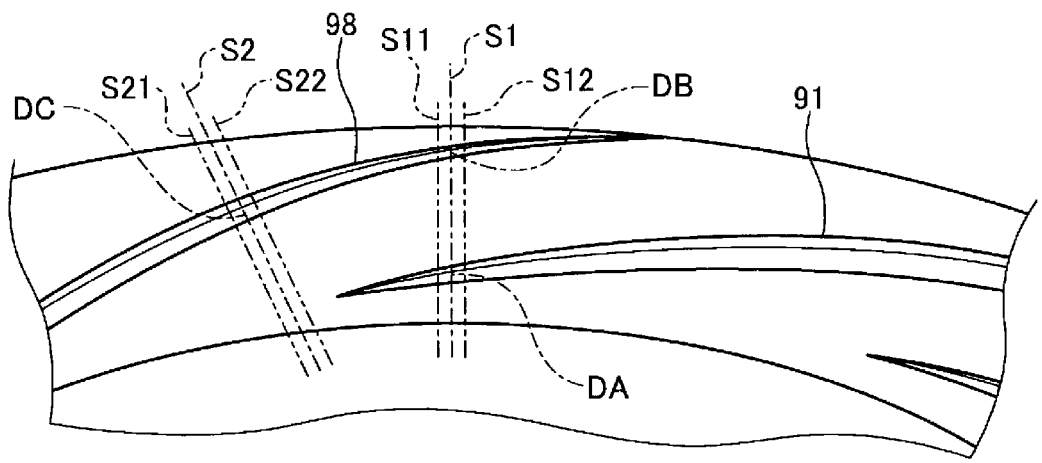
FIG. 5A is a drawing describing the mass per unit length and the area of a cross section of the protrusions.

The unit length of the protrusion 91 is, for example, 1 mm. The mass per unit length of the protrusion 91 is described while referencing FIG. 5A. In FIG. 5A, a straight line S11 and a straight line S12 are contrived. The straight line S11 and the straight line S12 are disposed 0.5 mm away from the first straight line S1 on both sides of, and in parallel with, the first straight line S1. A spacing between the straight line S11 and the straight line S12 is the unit length, that is, 1 mm. In other words, the mass per unit length of the protrusions 9 which a straight line crosses is defined as the mass of the protrusion included in a range, where the straight line extending in the radial direction is a center line and a width in a direction orthogonal to the center line is the unit length. Moreover, of the material constituting the protrusion 91, the mass of a portion included between a surface (not illustrated in the drawings) that includes the straight line S11 and is parallel with the center of rotation (rotation axis) P of the tire, and a surface (not illustrated in the drawings) that includes the straight line S12 and is parallel with the center of rotation (rotation axis) P of the tire is the mass per unit length (g/mm) of the protrusion 91.

Likewise, of the material constituting the protrusion 98, the mass of a portion included between a surface (not illustrated in the drawings) that includes the straight line S11 and is parallel with the center of rotation (rotation axis) P of the tire, and a surface (not illustrated in the drawings) that includes the straight line S12 and is parallel with the center of rotation (rotation axis) P of the tire is the mass per unit length (g/mm) of the protrusion 98. Additionally, a straight line S21 and a straight line S22 are contrived. The straight line S21 and the straight line S22 are disposed 0.5 mm away from the second straight line S2 on both sides of, and in parallel with, the second straight line S2. Moreover, of the material constituting the protrusion 98, the mass of a portion included between a surface (not illustrated in the drawings) that includes the straight line S21 and is parallel with the center of rotation (rotation axis) P of the tire, and a surface (not illustrated in the drawings) that includes the straight line S22 and is parallel with the center of rotation (rotation axis) P of the tire is the mass per unit length (g/mm) of the protrusion 98.

Moreover, as described above, the ratio of the sum of the masses per unit length of the protrusions 91 and 98 the first straight line S1 crosses to the sum of the masses per unit length of the protrusion 98 the second straight line S2 crosses is a value close to 1. In cases where any first straight line and second straight line that pass through the center of rotation P of the pneumatic tire 1 and extend in the tire radial direction are contrived, provided that the ratio of the sums of the masses per unit length of the protrusions 9 which each of the straight lines cross is a value close to 1, the uniformity of the pneumatic tire 1 can be maintained in a good manner.

Cross-Sectional Area of the Protrusions

Additionally, in cases where the relationship between the first straight line S1 and the second straight line S2 and the protrusions 9 is as described above, a ratio of an area of a cross section along the second straight line S2 of the single protrusion 98 the second straight line S2 crosses to a sum of areas of cross sections along the first straight line S1 of the two or more protrusions 91 and 98 the first straight line S1 crosses is not less than 0.8 and not greater than 1.2 (that is, is a value close to 1). In cases where a portion of the protrusions 9 is formed from a different material, the protrusions can be appropriately arranged and uniformity can be maintained in a good state by using the cross-sectional area as a criterion separately from or together with the mass per unit length described above.

Figure 5B:
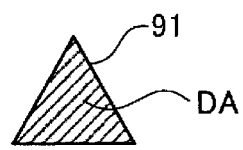
FIG. 5B is a drawing describing the mass per unit length and the area of a cross section of the protrusions.
Figure 5C:
FIG. 5C is a drawing describing the mass per unit length and the area of a cross section of the protrusions.
Figure 5D:
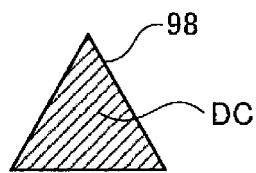
FIG. 5D is a drawing describing the mass per unit length and the area of a cross section of the protrusions.

The cross section along the first straight line S1 of the protrusion 91 that the first straight line S1 crosses (the cross section along the surface that includes the first straight line S1 and is parallel with the center of rotation (rotation axis) P of the tire) is, for example, a cross section DA illustrated in FIG. 5B. The cross section along the first straight line S1 of the protrusion 98 that the first straight line S1 crosses (the cross section along the surface that includes the first straight line S1 and is parallel with the center of rotation (rotation axis) P of the tire) is, for example, a cross section DB illustrated in FIG. 5C. The cross section along the second straight line S2 of the protrusion 98 that the second straight line S2 crosses (the cross section along the surface that includes the second straight line S2 and is parallel with the center of rotation (rotation axis) P of the tire) is, for example, a cross section DC illustrated in FIG. 5D.

Moreover, as described above, the ratio of the area of the cross section DC along the second straight line S2 of the single protrusion 98 the second straight line S2 crosses to the sum of the areas of the cross sections DA and DB along the first straight line S1 of the two or more protrusions 91 and 98 the first straight line S1 crosses is a value close to 1. That is, in cases where any first straight line and second straight line that pass through the center of rotation P of the pneumatic tire 1 and extend in the tire radial direction are contrived, provided that the ratio of the sums of the areas of the cross sections of the protrusions 9 which each of the straight lines cross is a value close to 1, the uniformity of the pneumatic tire 1 can be maintained in a good manner.

Note that the shape or length of the protrusions may be adjusted or the number of protrusions may be increased or decreased in order to realize the mass relationship and the cross-sectional area relationship described above. For example, the mass relationship and the cross-sectional area relationship described above can be realized with a configuration in which a height of a central portion of the protrusions 9 is greater than a height of both end portions of the protrusions 9. If the height of the central portion of the protrusions 9 is the same as the height of both end portions of the protrusions 9, in cases where any two straight lines are contrived, the mass relationship and the cross-sectional area relationship described above can be realized by arranging the protrusions 9 such that the number of protrusions overlapping in the radial direction is the same.

Height and Width of the Protrusions

Figure 6A:
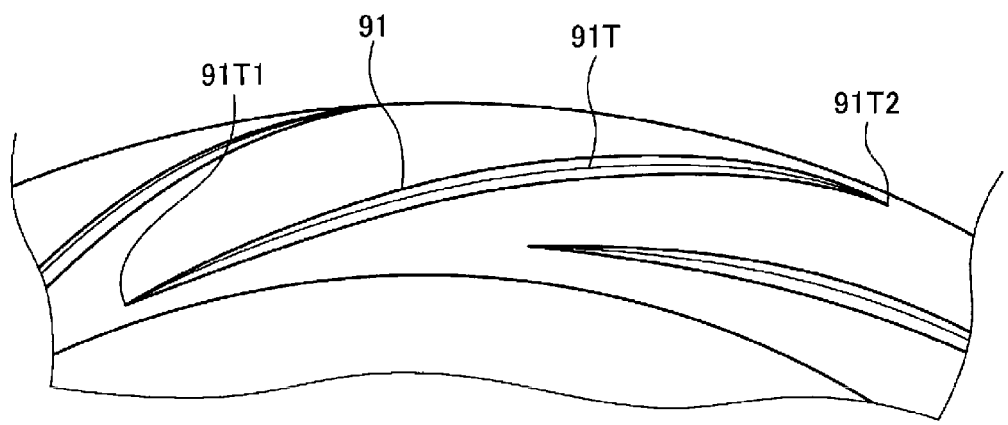
FIG. 6A is a drawing describing a height and a width of the protrusions.
Figure 6B:
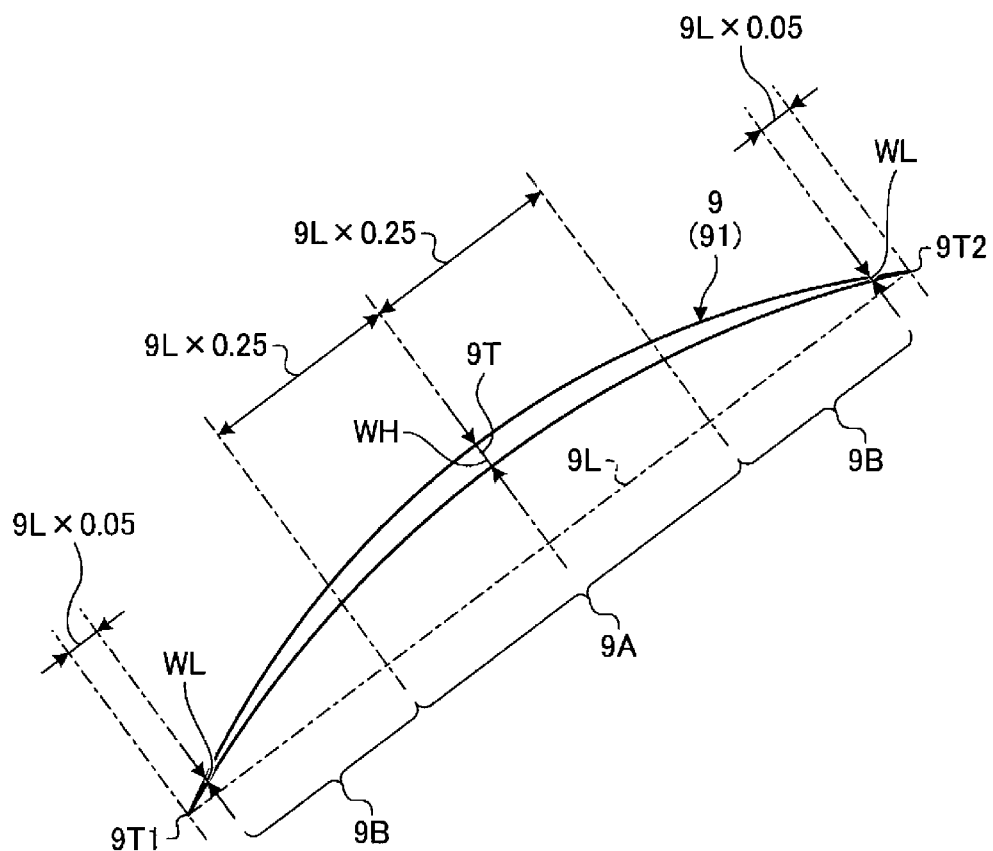
FIG. 6B is a drawing describing the height and the width of the protrusions.
Figure 6C:
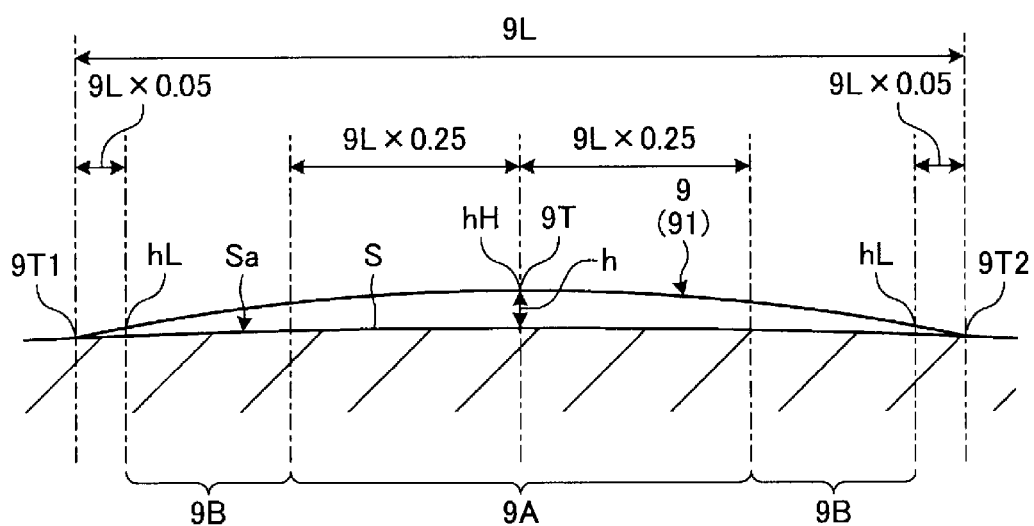
FIG. 6C is a drawing describing the height and the width of the protrusions.

FIGS. 6A to 6C are drawings explaining the height and the width of the protrusions 9. FIG. 6B is an enlarged view of a protrusion, viewed from the side surface of the pneumatic tire. FIG. 6C is a side view of the protrusion. With the protrusion 91 illustrated in FIGS. 6A to 6C, the height of a central portion 91T of the protrusion 91 is greater than the heights of the end portion 91T1 and the end portion 91T2. Thus, the mass relationship and the cross-sectional area relationship described above can be realized due to the fact that the height of central portion of the protrusion 9 is greater than the height of both end portions of the protrusion 9.

Specifically, as illustrated in FIGS. 6B and 6C, the protrusion 9 is constituted from a center portion 9A in an extending direction of the protrusion 9 and tip portions 9B provided so as to be continuous on both sides in the extending direction of the center portion 9A. A length 9L in the extending direction of the protrusion 9 is the shortest distance (straight line) between end portions 9T1 and 9T2 of the protrusion 9. The center portion 9A is a portion extending 25% of the length 9L, from a middle 9T of the length 9L, toward both sides in the extending direction. The tip portions 9B are provided extending to both sides in the extending direction from the center portion 9A, and ranges of the tip portions 9B do not include 5% of the length 9L from the end portions 9T1 and 9T2 in the extending direction of the protrusion 9.

Moreover, the center portion 9A includes a maximum position hH where a protruding height h from the tire side surface Sa is a maximum. Additionally, the tip portions 9B include minimum positions hL where the protruding height h from the tire side surface Sa is a minimum. In FIG. 6C, the protruding height h in the extending direction of the protrusion 9 increases gradually from the end portion 9T1 on one side toward the middle 9T, and decreases gradually from the middle 9T toward the end portion 9T2 on the other side. In this case, the maximum position hH of the protruding height h matches the middle 9T, and the minimum positions hL, respectively, are positions 5% of the length 9L from the end portion 9T1 and the end portion 9T2, and match the edges of the tip portions 9B. Note that, in FIG. 6C, the protruding height h in the extending direction of the protrusion 9 is illustrated as changing in an arc-like manner, but is not limited thereto and may change in a linear manner. Additionally, the maximum position hH may be disposed throughout the entire center portion 9A. In this case, the protruding height h of the tip portions 9B decreases gradually from the center portion 9A. Thus, with the protrusions 9, the height of the maximum position hH of the center portion 9A is greater than the height of the minimum position hL of both tip portions 9B.

Additionally, with the pneumatic tire 1 of the present embodiment, it is preferable that the protruding height h of the center portion 9A of the protrusions 9 is not less than 1 mm and not greater than 10 mm.

If the protruding height h of the center portion 9A is less than 1 mm, it will be more difficult to obtain the advantageous effects of the flow of air across the tire side portion S on the vehicle outer side being pushed to the vehicle outer side, a turbulent flow boundary layer (described later) being generated, and the like. On the other hand, if the protruding height h of the center portion 9A exceeds 10 mm, air resistance will tend to increase due to an increase in the flow of air colliding with the protrusions 9. As such, from the perspective of increasing down force and, also, obtaining significant advantageous effects of reducing air resistance, it is preferable that the protruding height h of the center portion 9A is not less than 1 mm and not greater than 10 mm.

Additionally, as illustrated in FIGS. 6A to 6C, a width of the central portion 91T of the protrusion 91 is greater than widths of the end portion 91T1 and the end portion 91T2. Thus, the mass relationship and the cross-sectional area relationship described above can be realized due to the fact that the width of the central portion of the protrusions 9 is greater than the widths of both end portions of the protrusions 9.

Specifically, as illustrated in FIG. 6B, the center portion 9A of the protrusion 9 includes a maximum width position WH. Additionally, the tip portions 9B of the protrusion 9 include minimum width positions WL. In FIG. 6B, the width of the protrusion 9 increases gradually from the end portion 9T1 on one side toward the middle 9T, and decreases gradually from the middle 9T toward the end portion 9T2 on the other side. In this case, the maximum width position WH of the width matches the middle 9T, and the minimum width positions WL respectively are positions 5% of the length 9L from the end portion 9T1 and the end portion 9T2, and match the edges of the tip portions 9B. Note that, in FIG. 6B, the width of the protrusion 9 is illustrated as changing in an arc-like manner, but is not limited thereto and may change in a linear manner. Additionally, the maximum width position WH may be disposed throughout the entire center portion 9A. In this case, the width of the tip portions 9B decreases gradually from the center portion 9A. Note that, in the present embodiment, "width of the protrusion 9" refers to a dimension in a direction orthogonal to the length 9L in the extending direction of the protrusion 9. Thus, with the protrusions 9, the maximum width position WH of the center portion 9A is greater than the minimum width positions WL of both tip portions 9B.

Note that with the pneumatic tire 1 of the embodiment described above, it is preferable that a width in the lateral direction of the protrusions 9 is not less than 0.5 mm and not greater than 10.0 mm. If the width in the lateral direction of the protrusions 9 is less than this range, the advantageous effects of improving the stagnation of the flow of air caused by the protrusions 9 will be difficult to obtain because the range in which the protrusion 9 contacts the flow of air will be small. On the other hand, if the width in the lateral direction of the protrusions 9 exceeds this range, the range in which the flow of air contacts the protrusions 9 will be large, which may lead to the protrusions 9 becoming a cause of increased air resistance, a cause of increased tire weight, and the like. Accordingly, by optimizing the width in the lateral direction of the protrusions 9, significant advantageous effects of improving the stagnation of the flow of air caused by the protrusions 9 can be obtained.

Overlap of the Protrusions

Figure 7:
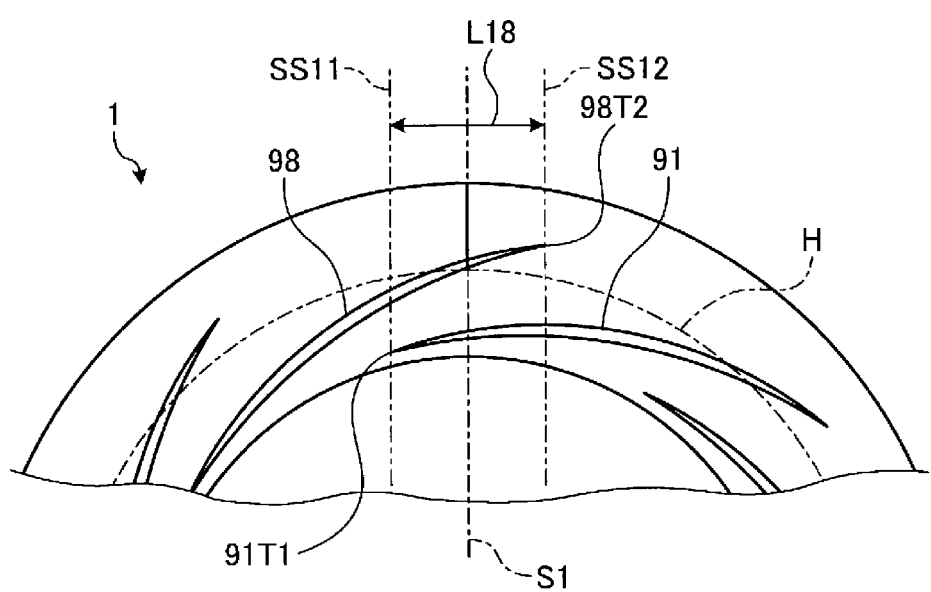
FIG. 7 is a drawing describing a length of the protrusions.

FIG. 7 is a drawing explaining a length of the protrusions 9. As illustrated in FIG. 7, the position where the first straight line S1 crosses the protrusion 91 and the position where the first straight line S1 crosses the protrusion 98 differ from each other in the tire radial direction. As such, the two protrusions 91 and 98 overlap in the radial direction along the first straight line S1.

Here, a straight line SS11 that passes through the end portion 91T1 of the protrusion 91 and is parallel with the first straight line S1 and a straight line SS12 that passes through the end portion 98T2 of the protrusion 98 and is parallel with the first straight line S1 are contrived. Here, a distance between the straight line SS11 and the straight line SS12 is a length L18 of a portion where the protrusion 91 and the protrusion 98 overlap each other.

The length L18 of the portion where the protrusion 91 and the protrusion 98 overlap each other is not less than 20% and not greater than 60% of the length of the protrusion 91, and also is not less than 20% and not greater than 60% of the length of the protrusion 98.

It is preferable that the length 9L of the protrusions 9 (illustrated in FIGS. 6B and 6C) is, for example, a length exceeding 30% of the height of the range SD of the tire side portion S.

Down force can be increased and, also, uniformity can be maintained in a good manner if the length of the protrusions is configured to be this length and, also, the length of the portion where the protrusions overlap in the radial direction is within the range described above.

Mass Variations in the Tire Circumferential Direction of the Protrusions

Figure 8:
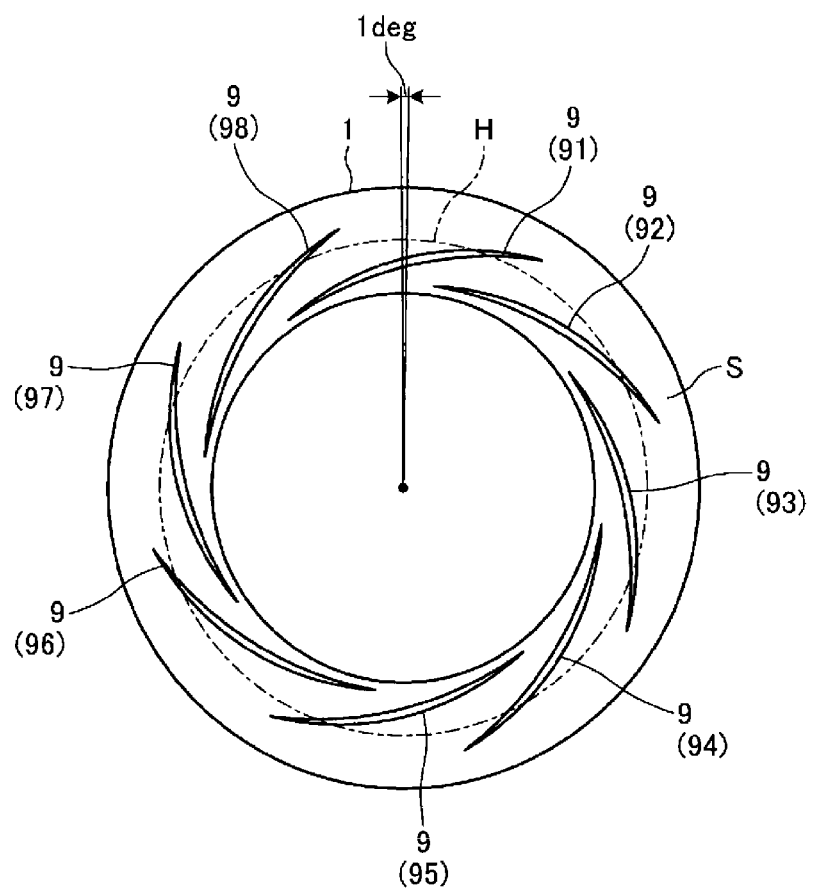
FIG. 8 is a drawing describing mass variations in the tire circumferential direction of the protrusions.

FIG. 8 is a drawing explaining mass variations in the tire circumferential direction of the protrusions 9. As illustrated in FIG. 8, it is preferable that the mass variation in the tire circumferential direction of the mass of the protrusions 9 per 1 degree in the tire circumferential direction, cut in the tire radial direction from the center of rotation (rotation axis) P, is not greater than 0.2 g/degree.

Homogeneity in the tire circumferential direction is improved by specifying the variation of mass in the tire circumferential direction of the protrusions 9 and, as a result, significant advantageous effects of enhancing uniformity can be obtained.

Cross-Sectional Shape of the Protrusions

Figure 9:
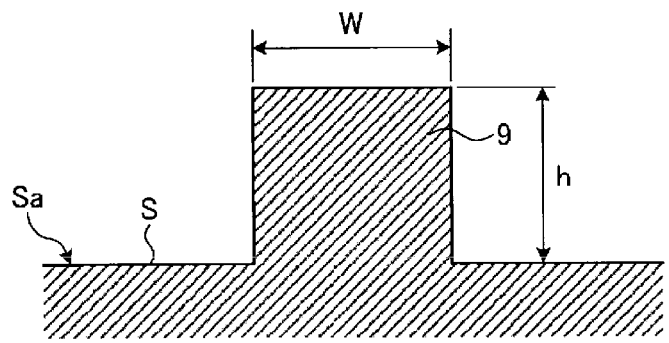
FIG. 9 is a cross-sectional view of a lateral direction of a protrusion.
Figure 10:
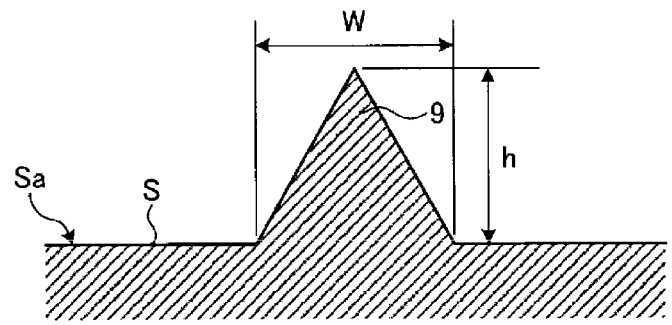
FIG. 10 is a cross-sectional view of the lateral direction of a protrusion.
Figure 11:
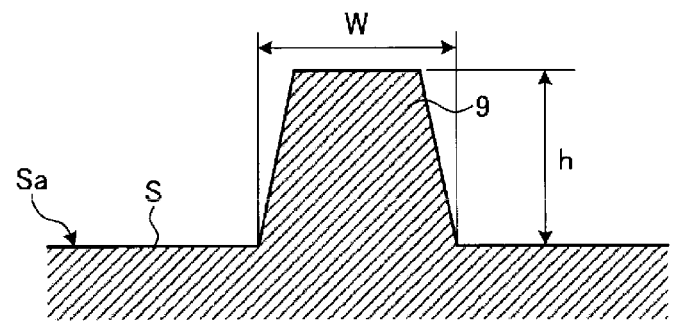
FIG. 11 is a cross-sectional view of the lateral direction of a protrusion.
Figure 12:
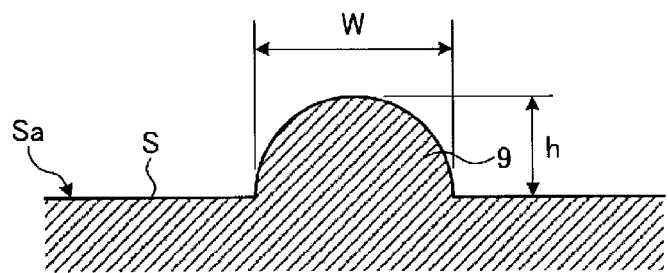
FIG. 12 is a cross-sectional view of the lateral direction of a protrusion.

FIGS. 9 to 22 are drawings illustrating examples of cross sections in the lateral direction of the protrusion 9. Regarding the cross-sectional shape in the lateral direction orthogonal to the extending direction of the protrusions 9, the cross-sectional shape in the lateral direction of the protrusion 9 illustrated in FIG. 9 is a rectangular shape. The cross-sectional shape in the lateral direction of the protrusion 9 illustrated in FIG. 10 is a triangular shape. The cross-sectional shape in the lateral direction of the protrusion 9 illustrated in FIG. 11 is a trapezoidal shape. Additionally, the cross-sectional shape in the lateral direction of the protrusion 9 may have an external form based on curved lines. The cross-sectional shape in the lateral direction of the protrusion 9 illustrated in FIG. 12 is a semi-circular shape. In addition, while not illustrated in the drawings, the cross-sectional shape in the lateral direction of the protrusion 9 may have a shape based on various arcs such as, for example, a semi-oval shape or a semi-elliptical shape. Additionally, the cross-sectional shape in the lateral direction of the protrusion 9 may have an external form that is a combination of straight lines and curved lines.

Figure 13:
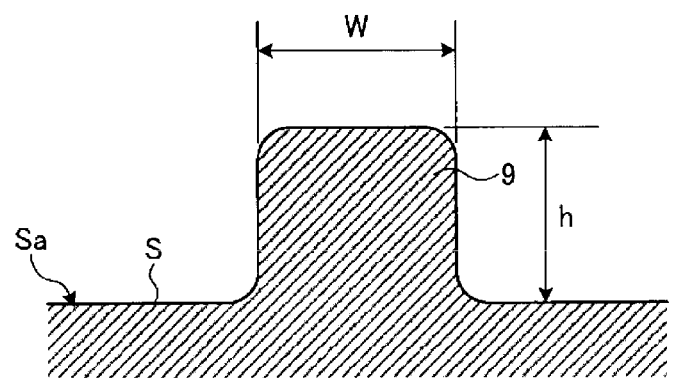
FIG. 13 is a cross-sectional view of the lateral direction of a protrusion.
Figure 14:
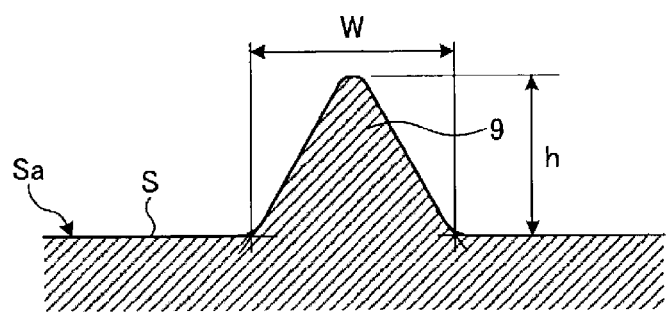
FIG. 14 is a cross-sectional view of the lateral direction of a protrusion.
Figure 15:
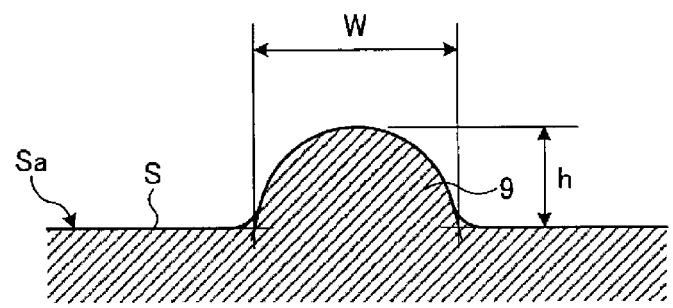
FIG. 15 is a cross-sectional view of the lateral direction of a protrusion.
Figure 16:
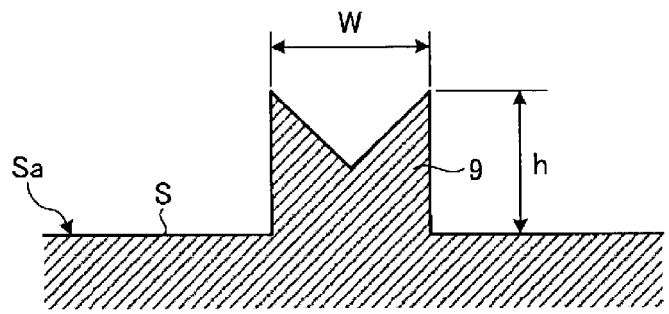
FIG. 16 is a cross-sectional view of the lateral direction of a protrusion.
Figure 17:
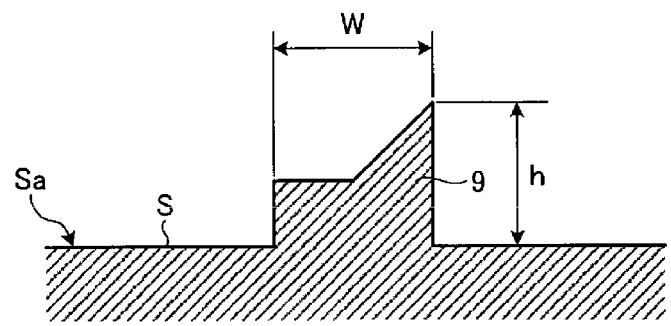
FIG. 17 is a cross-sectional view of the lateral direction of a protrusion.
Figure 18:
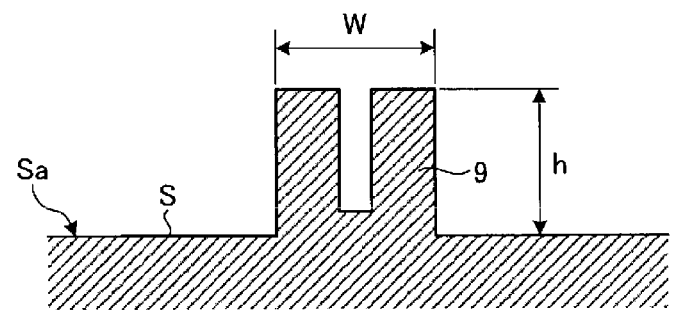
FIG. 18 is a cross-sectional view of the lateral direction of a protrusion.
Figure 19:
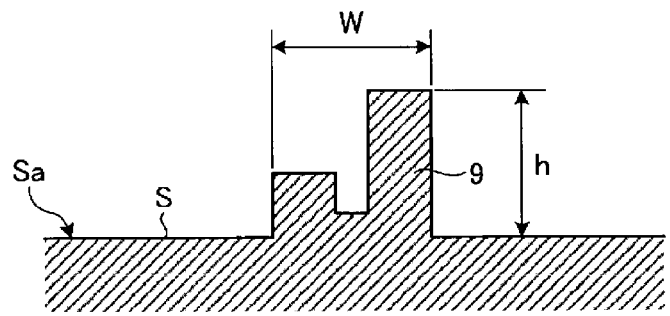
FIG. 19 is a cross-sectional view of the lateral direction of a protrusion.
Figure 20:
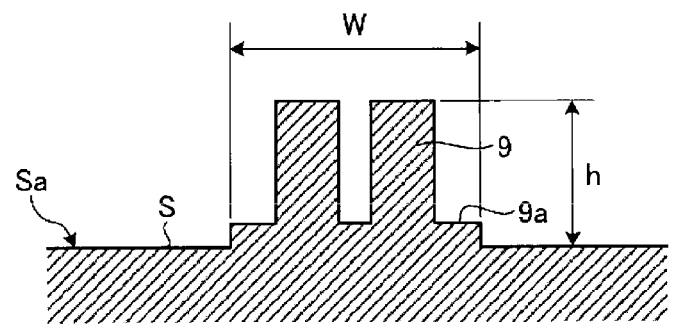
FIG. 20 is a cross-sectional view of the lateral direction of a protrusion.

The cross-sectional shape in the lateral direction of the protrusion 9 illustrated in FIG. 13 is a rectangular shape with curved corners. The cross-sectional shape in the lateral direction of the protrusion 9 illustrated in FIG. 14 is a triangular shape with curved corners. Additionally, as illustrated in FIGS. 13 to 15, the cross-sectional shape in the lateral direction of the protrusion 9 may be a shape in which a base portion that projects from the tire side portion S is curved. Additionally, the cross-sectional shape in the lateral direction of the protrusion 9 may be a combination of various shapes. The cross-sectional shape in the lateral direction of the protrusion 9 illustrated in FIG. 16 is a zigzag shape obtained by shaping a rectangular apex into a plurality (two in FIGS. 2A and 2B) of triangular shapes. The cross-sectional shape in the lateral direction of the protrusion 9 illustrated in FIG. 17 is a pointed shape obtained by shaping a rectangular apex into one triangular shape. The cross-sectional shape in the lateral direction of the protrusion 9 illustrated in FIG. 18 is a shape obtained by forming a rectangular recess in a rectangular apex. The cross-sectional shape in the lateral direction of the protrusion 9 illustrated in FIG. 19 is a shape obtained by forming a rectangular recess in a rectangular apex and varying the protruding heights h on both sides of the recess. The cross-sectional shape in the lateral direction of the protrusion 9 illustrated in FIG. 20 is a shape obtained by forming a rectangular base portion 9a that protrudes from the tire side portion S, and forming a plurality (two in FIG. 20) of protruding rectangular shapes on an upper portion of the base portion 9a. Additionally, while not explicitly illustrated in FIG. 20, the cross-sectional shape in the lateral direction of the protrusion 9 may be any of various shapes such as a waveform on the top of a rectangular shape or the like.

Figure 21:
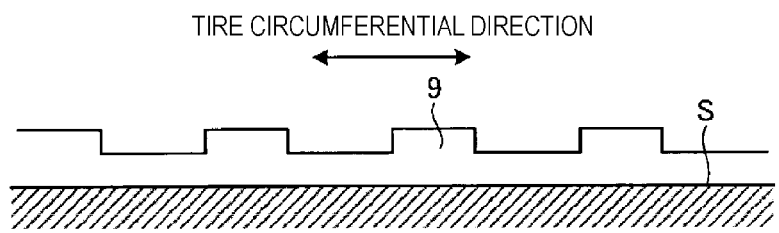
FIG. 21 is a side view of a longitudinal direction of a protrusion.
Figure 22:
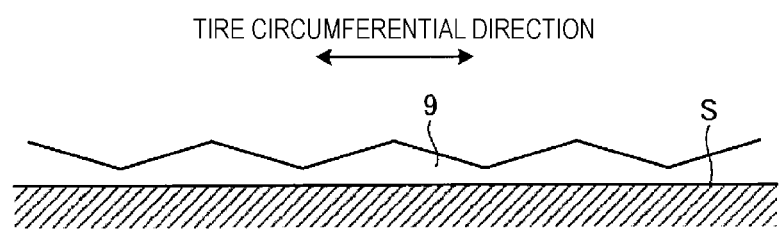
FIG. 22 is a side view of a longitudinal direction of a protrusion.

Also, in FIGS. 9 to 20, the protrusions 9 may be formed with a uniform cross-sectional shape in the longitudinal direction (the protruding height h from the tire side portion S or the width W in the lateral direction), or may be formed with a cross-sectional shape in the longitudinal direction (the protruding height h from the tire side portion S) that varies such as illustrated in the side views of the longitudinal direction of the protrusion 9 illustrated in FIGS. 21 and 22. The protrusion 9 illustrated in FIG. 21 is formed such that the protruding edge from the tire side portion S has an uneven shape (comb tooth shape) along the longitudinal direction. The protrusion 9 illustrated in FIG. 22 is formed such that the protruding edge from the tire side portion S has an uneven shape (zigzag shape) along the longitudinal direction. Additionally, while not explicitly illustrated in FIG. 22, the protrusion 9 may be formed such that the protruding edge from the tire side portion S has an uneven shape (wave shape) along the longitudinal direction. Moreover, while not explicitly illustrated in FIG. 22, the protrusion 9 may be formed such that the width in the lateral direction varies along the longitudinal direction.

Figure 23A:
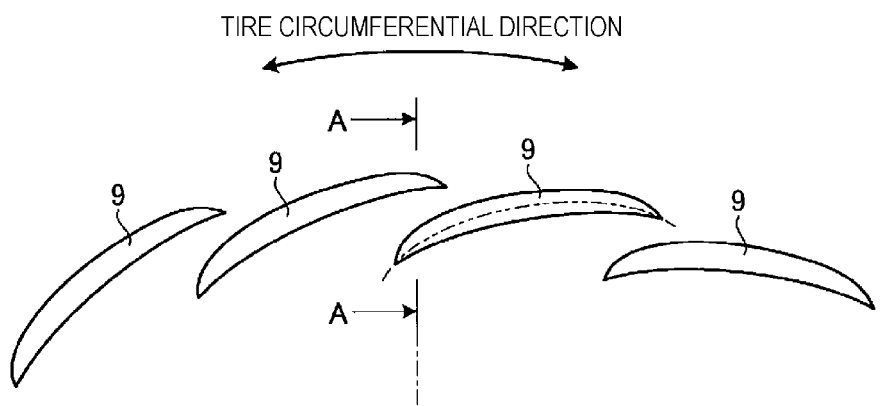
FIG. 23A is an appearance view of the protrusions.
Figure 23B:
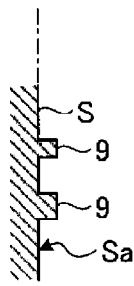
FIG. 23B is a cross-sectional view taken along line A-A of FIG. 23A.

FIG. 23A is an appearance view of the protrusions 9. FIG. 23B is a cross-sectional view taken along line A-A of FIG. 23A. As illustrated in FIGS. 23A and 23B, the protrusions 9 are formed so as to curve and extend in the longitudinal direction, and a center line in the longitudinal direction of the protrusions 9 includes more tire circumferential direction component than tire radial direction component. That is, the protrusions 9 are formed such that an angle with a tangent line to the tire circumferential direction is smaller than 90 degrees.

Figure 24A:
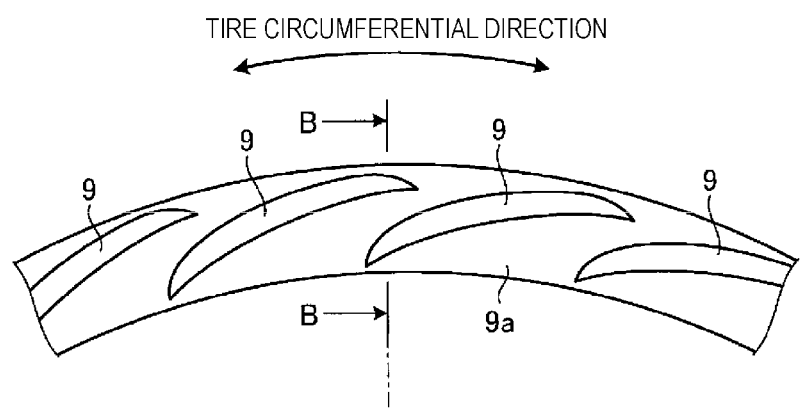
FIG. 24A is an appearance view of the protrusions.
Figure 24B:
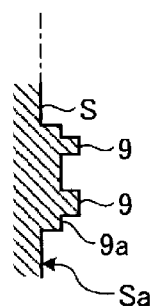
FIG. 24B is a cross-sectional view taken along line B-B of FIG. 24A.

FIG. 24A is an appearance view of the protrusions 9. FIG. 24B is a cross-sectional view taken along line B-B of FIG. 24A. As illustrated in FIGS. 24A and 24B, the base portion 9a that is longitudinally rectangular along the tire circumferential direction is formed protruding from the tire side portion S, and the protrusions 9 illustrated in FIGS. 23A and 23B are formed protruding from the upper portion of the base portion 9a.

Additionally, the protrusions 9 may be provided on the tire side portions S on both sides in the tire width direction, or may be provided on the tire side portion S on one side in the tire width direction.

Thus, with the pneumatic tire 1 of the present embodiment, protrusions 9 extending primarily longitudinally along the tire circumferential direction are arranged on at least one tire side portion S, farther outward in the tire radial direction than the tire maximum width position H.

According to this pneumatic tire 1, the air passing across the tire side portion S can be made turbulent by the protrusions 9. As such, a turbulent flow boundary layer is generated around the pneumatic tire 1, and expansion behind the vehicle of air flowing across the vehicle outer side is suppressed. As a result, it is possible to suppress spreading of passing air, reduce air resistance of the pneumatic tire 1, and improve fuel economy. Moreover, due to the fact that the protrusions 9 primarily extend longitudinally along the tire radial direction, the structure is comparatively simple. As a result, complication of the structure can be suppressed and manufacturing costs of the pneumatic tire 1 can be reduced.

Grooves and Dimples of the Protrusions

Providing the protrusions 9 on the tire side portion S leads to increased stiffness in that portion. Increased stiffness of the tire side portion S may affect the performance factors of the tire such as riding comfort and the like. As such, grooves or slits and/or dimples may be provided in the protrusions 9 in order to suppress increases in stiffness.

Figure 25A:
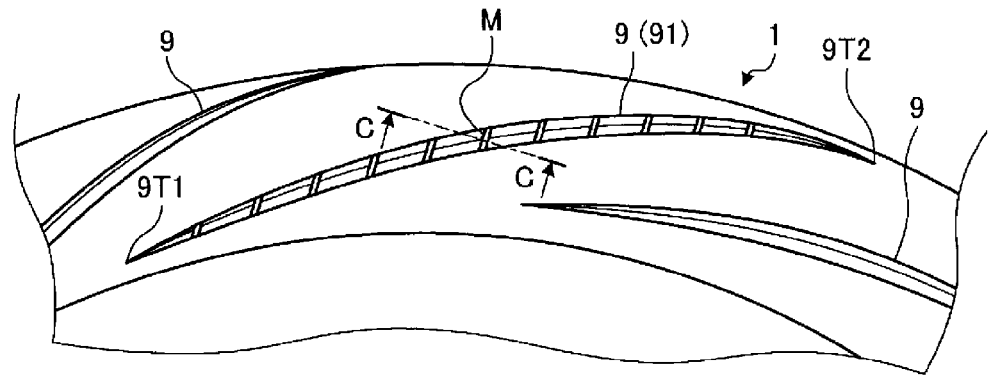
FIG. 25A is a drawing illustrating an example of a protrusion in which grooves are provided.
Figure 25B:
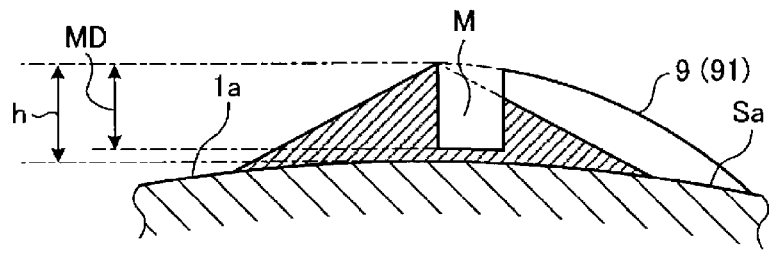
FIG. 25B is a cross-sectional view taken along line C-C of FIG. 25A.

FIG. 25A is a drawing illustrating an example of a protrusion in which grooves are provided. FIG. 25B is a cross-sectional view taken along line C-C of FIG. 25A. Hereinafter, a description is given of an example in which grooves are provided in the protrusion 91, but this description also applies to the other protrusions.

As illustrated in FIG. 25A, the protrusion 91 provided on the tire side portion S of the pneumatic tire 1 includes a plurality of grooves M in the surface of and along the protrusion 91 between both end portions 9T1 and 9T2. In cases where the grooves M are provided, the protrusion 91 is divided by the grooves M and the protrusion 91 can be thought of as physically individual protrusions bordered by the grooves M. However, in cases where a width of the grooves M is 2 mm or less, there are no problems with aerodynamic characteristics, a singular protrusion 91 including the grooves M is constituted, there are no effects on aerodynamics, and there are no effects on the advantageous effects of increasing down force.

As illustrated in FIG. 25B, a depth MD of the grooves M may be any depth, provided that it is less than the protruding height h of the protrusion 91, for example. That is, the depth MD of the groove M may be any depth, provided that it does not reach a profile 1a (the tire side surface Sa) of the pneumatic tire 1, for example. Additionally, it is preferable that the depth MD of the grooves M is not greater than 90% of the protruding height h from the apex of the protrusion 91 to the profile 1a, which is the range of the grooves M of a tire 1 that is not provided with grooves, for example. Note that the triangular shape cross section in the lateral direction of the protrusion 9 in FIG. 26B is given as an example.

The grooves M may be provided throughout a portion or all of the protrusion 91. A single groove M may be provided or a plurality of grooves M may be provided. In cases where providing a plurality of grooves M, the spacing between the grooves M may be configured to be constant and the grooves M may be provided at equal spacings in the tire circumferential direction, or the spacing between the grooves M may be configured to vary. Compared to a case where the grooves M are not provided, increases in the stiffness of the tire side portion S can be suppressed and declines in riding comfort can be prevented by providing at least one of the protrusions 9 with the grooves M. Moreover, the mass of at least one of the protrusions 9 is reduced as a result of the grooves M being formed and, as such, declines in uniformity caused by increases in mass attributable to the protrusions 9 can be suppressed.

Figure 25C:
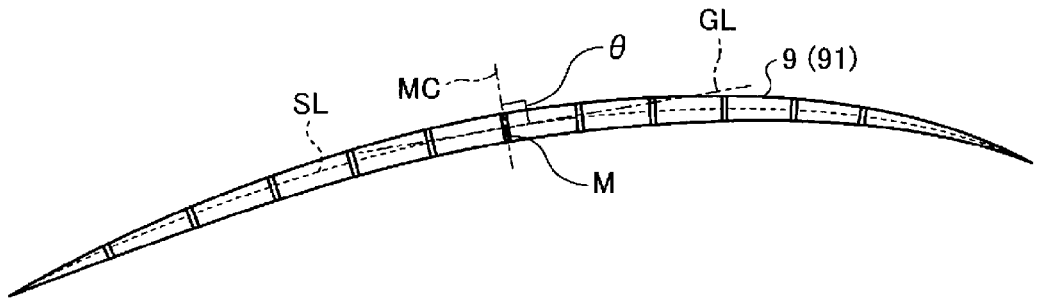
FIG. 25C is a drawing illustrating an example of an angle of the grooves with respect to the protrusion.
Figure 25D:
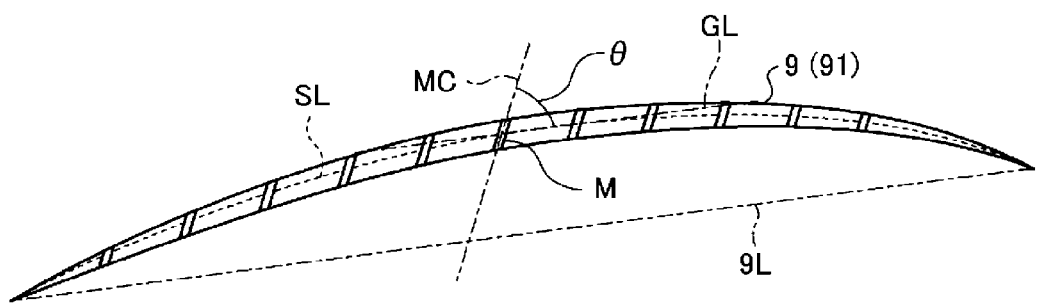
FIG. 25D is a drawing illustrating an example of an angle of the grooves with respect to the protrusion.

FIGS. 25C and 25D are drawings illustrating examples of an angle of the grooves M with respect to the protrusion 91. As illustrated in FIG. 25C, from the perspective of suppressing extreme mass variation in the extending direction of the protrusion 9, it is preferable that an extending center line MC of each groove M is configured with the same angle θ (e.g. θ=90°) with respect to a corresponding tangent line GL of a center line SL passing through the center in the lateral direction of the protrusion 9. As illustrated in FIG. 25D, a configuration is possible in which, for example, the extending center line MC of the grooves M is configured with an angle θ other than 90° with respect to the tangent line GL of the center line SL passing through the center in the lateral direction of the protrusion 9. Note that, in FIG. 25D, the extending center lines MC of the grooves M are provided in plurality at a predetermined spacing with respect to the length 9L so as to intersect the extending direction of the protrusion 9. Additionally, the shape of the grooves M need not be linear. For example, the shape of the grooves M may be a curved shape, a bent linear shape, or a wavy line shape.

Figure 26A:
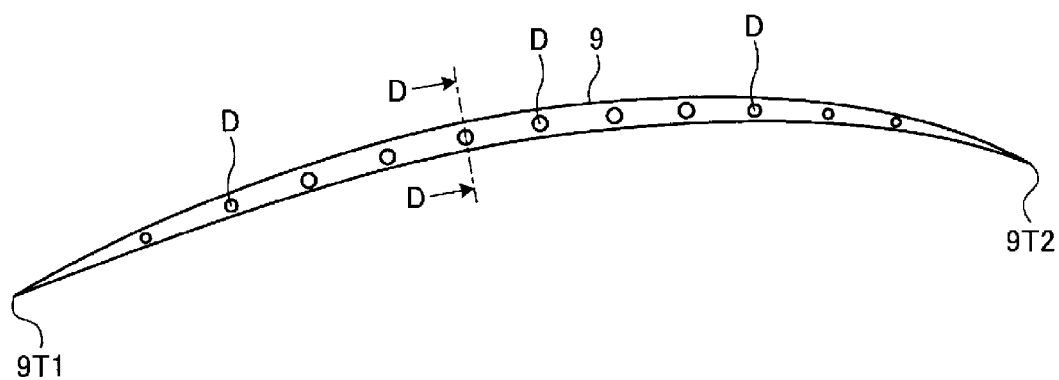
FIG. 26A is a drawing illustrating an example of a protrusion in which dimples are provided.
Figure 26B:
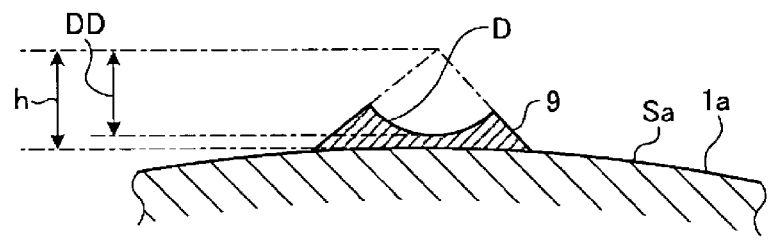
FIG. 26B is a cross-sectional view taken along line D-D of FIG. 26A.

FIG. 26A is a drawing illustrating an example of a protrusion in which dimples are provided. FIG. 26B is a cross-sectional view taken along line D-D of FIG. 26A. As illustrated in FIG. 26A, the protrusion 9 provided on the tire side portion S of the pneumatic tire 1 includes a plurality of dimples D in the surface of and along the protrusion 9 between both end portions 9T1 and 9T2. In cases where the dimples D are provided, a portion of the protrusion 9 is divided by the dimples D and the protrusion 9 can be thought of as physically individual protrusions bordered by the dimples D. However, in cases where an opening diameter of the dimples D is 2 mm or less, there are no problems with aerodynamic characteristics, a singular protrusion 9 including the dimples D is constituted, there are no effects on aerodynamics, and there are no effects on the advantageous effects of increasing down force.

As illustrated in FIG. 26B, a depth DD of the dimple D may be any depth, provided that it is less than the protruding height h of the protrusion 9, for example. The depth DD of the dimple D may be any depth, provided that it does not reach a profile 1a (the tire side surface Sa) of the pneumatic tire 1, for example. Additionally, it is preferable that the depth DD of the dimple D is not greater than 90% of the protruding height h from the apex of the protrusion 9 to the profile 1a, which is the range of the dimples D where the dimples D are not provided, for example. Note that the triangular shape cross section in the lateral direction of the protrusion 9 in FIG. 27B is given as an example.

The dimples D may be provided throughout a portion or all of the protrusion 9. A single dimple D may be provided or a plurality of dimples D may be provided. In cases where providing a plurality of dimples D, the spacing between the dimples D may be configured to be constant and the dimples D may be provided at equal spacings in the tire circumferential direction, or the spacing between the dimples D may be configured to vary. Compared to a case where the dimples D are not provided, increases in the stiffness of the tire side portion S can be suppressed and declines in riding comfort can be prevented by providing the protrusions 9 with the dimples D. Moreover, the mass of the protrusions 9 is reduced as a result of the dimples D being formed and, as such, declines in uniformity caused by increases in mass attributable to the protrusions 9 can be suppressed.

Figure 27:
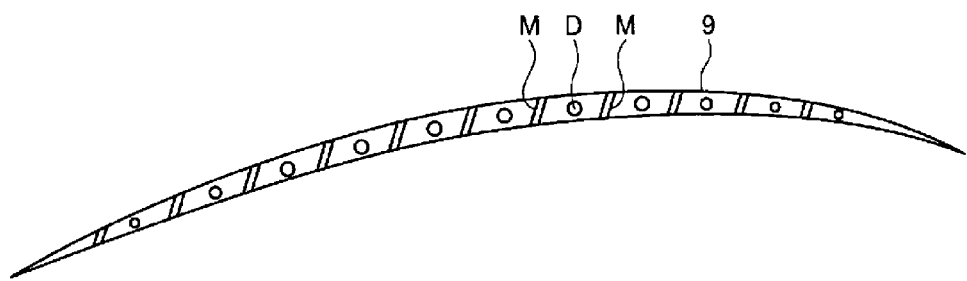
FIG. 27 is a drawing illustrating an example of a protrusion in which grooves and dimples are provided.

In the pneumatic tire 1 of the present embodiment, it is preferable that the grooves M and the dimples D are formed in the surface of the protrusions 9 as illustrated in FIG. 27, in which an example of a protrusion 9 is illustrated where the grooves M and the dimples D are provided.

The stiffness of the protrusions 9 is reduced as a result of the grooves M and the dimples D being formed and, as such, declines in riding comfort caused by the tire side portion S becoming a rigid structure due to the protrusions 9 can be suppressed. Moreover, the mass of the protrusions 9 is reduced as a result of the grooves M and the dimples D being formed and, as such, declines in uniformity caused by increases in mass attributable to the protrusions 9 can be suppressed. Note that, in FIG. 28, the grooves M and the dimples D are alternately provided along the extending direction of the protrusion 9, but the arrangement of the grooves M and the dimples D is not limited thereto and arrangements are possible in which the grooves M and the dimples D are appropriately mixed.

It is preferable that the grooves M and the dimples D are provided in a portion of the tire side portion S where deflection is great. For example, it is preferable that, of the range SD of the tire side portion S, the grooves M and the dimples D are provided in a range that includes the tire maximum width position H.

Figure 28:
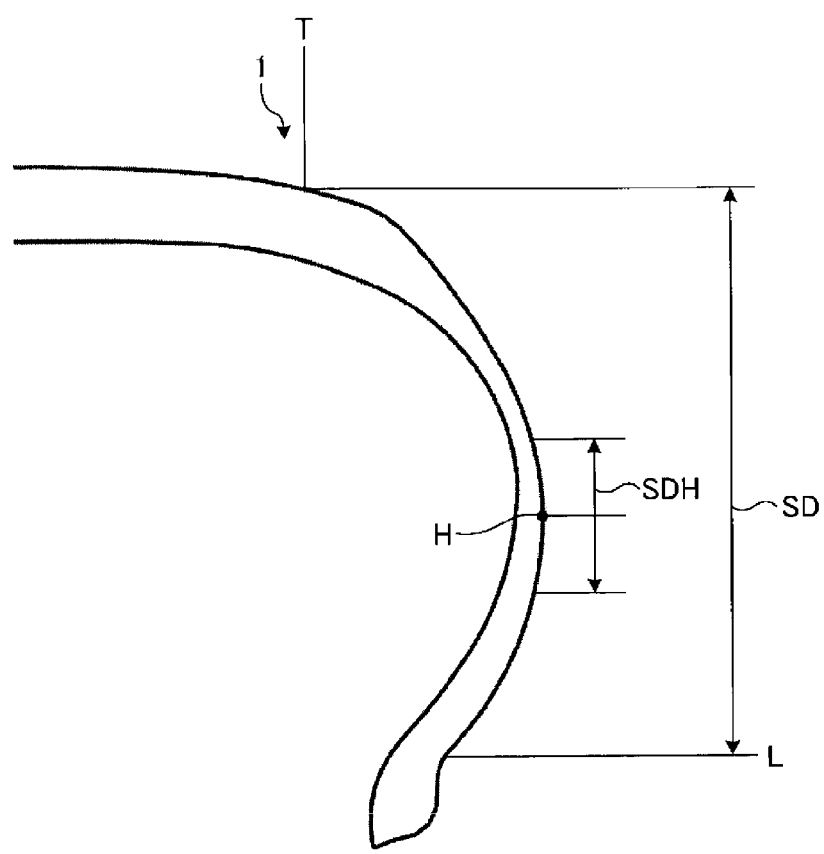
FIG. 28 is a drawing illustrating a range in which the grooves and the dimples are provided in the protrusion.

FIG. 28 is a drawing illustrating a range SDH in which the grooves M and the dimples D are provided in the protrusion. In FIG. 28, the grooves M and the dimples D are, for example, provided in the portion of the range SDH of the protrusions 9 (not illustrated in FIG. 28) provided on the tire side portion S. A height of the range SDH where the grooves M and the dimples D are provided is, for example, not less than 20% and not greater than 80% of a height of the range SD of the tire side portion S, with height tire maximum width position H of the tire side portion S as a center. Increases in the stiffness of the tire side portion S can be suppressed and declines in riding comfort can be prevented by providing the grooves M and the dimples D in the protrusions 9 provided in this range SDH.

Additionally, in the pneumatic tire 1 of the present embodiment, it is preferable that the spacings in the tire circumferential direction between the protrusions 9 are not uniform.

According to this pneumatic tire 1, periodicity in the tire circumferential direction of the protrusions 9 with respect to the air flow along the tire side surface Sa of the tire side portion S is canceled. As such, sound pressures generated from the protrusions 9 will have different frequencies and, as such, will disperse each other or cancel each other out. As a result, noise (sound pressure levels) can be reduced.

Note that, in a side view of the pneumatic tire 1, the "spacing of the protrusions 9" is represented as an angle between auxiliary lines (not illustrated in the drawings) of the protrusions 9, the angle having the center of rotation (rotation axis) P as a center. The auxiliary lines are drawn in the tire radial direction from the end portions 9T1 and 9T2 of the protrusion 9. Moreover, making the shape of the protrusions 9 (the protruding height h, the width W in the lateral direction, the length 9L in the extending direction) and the incline that intersects the tire circumferential direction or the tire radial direction the same and changing the pitch in the tire circumferential direction; changing the shape (the protruding height h, the width W in the lateral direction, the length 9L in the extending direction); changing the incline intersecting the tire circumferential direction or the tire radial direction; and the like can be carried out in order to make the spacings between the protrusions 9 not uniform.

Additionally, the pitch in the tire circumferential direction of the protrusions 9 may be a pitch equal to or different from the pitch in the tire circumferential direction of the lug grooves in the tread portion 2. If the pitch in the tire circumferential direction of the protrusions 9 is configured to be different from the pitch in the tire circumferential direction of the lug grooves in the tread portion 2, the sound pressure generated from the protrusions 9 and the sound pressure caused by the lug grooves will have different frequencies and, as such, will disperse each other or cancel each other out. As a result, pattern noise generated by the lug grooves can be reduced. Note that, herein, the lug grooves, for which the pitch in the tire circumferential direction is different from that of the protrusions 9, include all of the lug grooves in the rib-like land portions 23 of which a plurality are partitioned and formed in the tire width direction by the plurality of main grooves 22. However, from the perspective of obtaining significant advantageous effects of reducing pattern noise generated by the lug grooves, it is preferable that the pitch in the tire circumferential direction of the protrusions 9 is configured to be different from the pitch of the lug grooves on the outermost side in the tire width direction that are disposed nearest to the protrusions 9.

Additionally, with the pneumatic tire 1 according to the present embodiment, it is preferable that a vehicle inner side/outer side orientation when the pneumatic tire 1 is mounted on a vehicle is designated; and the protrusions 9 are disposed on the tire side portion S that becomes the vehicle outer side.

Specifically, in cases where the pneumatic tire 1 of the present embodiment is mounted on the vehicle 100 (see FIGS. 3A and 3B), the orientation of the inner side and the outer side in the tire width direction of the vehicle 100 is designated. The designation of the orientation of the vehicle inner side and the vehicle outer side is, for example, indicated by an indicator provided on the sidewall portion 4 (not explicitly illustrated in the drawings). Therefore, the side facing the inner side of the vehicle 100 when mounted on the vehicle 100 is the "vehicle inner side", and the side facing the outer side of the vehicle 100 is the "vehicle outer side". Note that the designations of the vehicle inner side and the vehicle outer side are not limited to cases when mounted on the vehicle 100. For example, in cases in which the pneumatic tire 1 is mounted on a rim, orientation of the rim 50 with respect to the inner side and the outer side in the tire width direction of the vehicle 100 is predetermined. Thus, in cases in which the pneumatic tire 1 is mounted on a rim, the orientation with respect to the vehicle inner side and the vehicle outer side in the tire width direction is designated.

The tire side portion S on the vehicle outer side appears outward from the tire house 100H when the pneumatic tire 1 is mounted on the vehicle 100. As such, by providing the protrusions 9 on the tire side portion S on the vehicle outer side, the flow of air can be pushed to the vehicle outer side and down force can be increased.

Other Arrangement Examples of the Protrusions

FIGS. 29 to 32 are drawings illustrating other examples of the protrusions 9.

Figure 29:
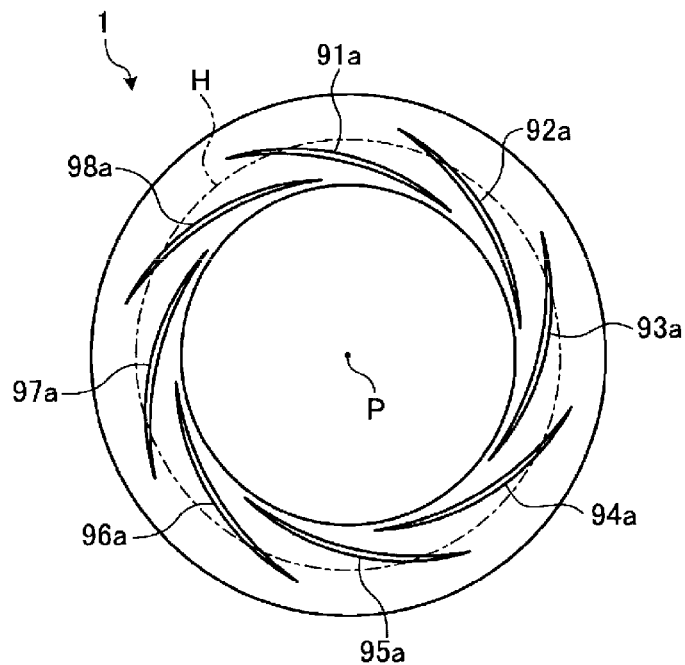
FIG. 29 is a drawing illustrating another arrangement example of the protrusions.

The pneumatic tire 1 illustrated in FIG. 29 includes a plurality of protrusions 91a, 92a, 93a, 94a, 95a, 96a, 97a, and 98a on the tire side portion S. In this example, spacings between the plurality of protrusions 91a, 92a, 93a, 94a, 95a, 96a, 97a, and 98a are uniform, that is, equidistant. Moreover, in this example, the plurality of protrusions 91a, 92a, 93a, 94a, 95a, 96a, 97a, and 98a are arranged in the range SD that includes the tire maximum width position H.

The protrusion 91a is provided on the tire side portion S on the outer side of the vehicle 100 on which the tire is mounted. The relationship between both end portions and the center of rotation P of the pneumatic tire 1 for the protrusion 91a is the reverse of that for the protrusion 91 illustrated in FIG. 2A. Specifically, with the protrusion 91a, the end portion in the clockwise direction is disposed farther inward in the tire radial direction than the end portion in the counter-clockwise direction. As with the protrusion 91 illustrated in FIG. 2B, when viewed from the outer side of the vehicle 100 in a direction along the center of rotation (rotation axis) P of the pneumatic tire 1, the protrusion 91a has an arc shape, and the concave side of the arc faces the center of rotation P of the pneumatic tire 1. The other protrusions 92a, 93a, 94a, 95a, 96a, 97a, and 98a have the same configuration as the protrusion 91a.

Figure 30:
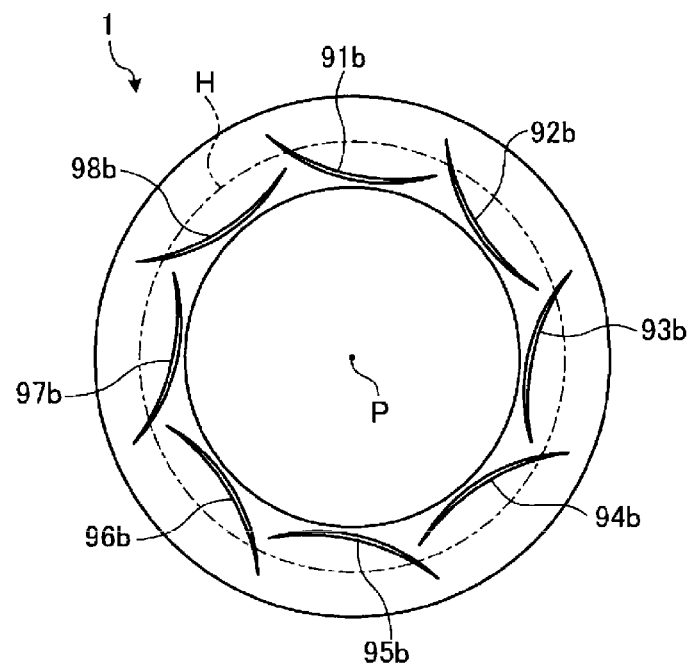
FIG. 30 is a drawing illustrating another arrangement example of the protrusions.

The pneumatic tire 1 illustrated in FIG. 30 includes a plurality of protrusions 91b, 92b, 93b, 94b, 95b, 96b, 97b, and 98b on the tire side portion S. In this example, spacings between the plurality of protrusions 91b, 92b, 93b, 94b, 95b, 96b, 97b, and 98b are uniform, that is, equidistant. Moreover, in this example, the plurality of protrusions 91*b*, 92*b*, 93*b*, 94*b*, 95*b*, 96*b*, 97*b*, and 98*b* are arranged in the range SD that includes the tire maximum width position H.

When viewed from the outer side of the vehicle 100 in a direction along the center of rotation (rotation axis) P of the pneumatic tire 1, the protrusion 91*b* has an arc shape, and the convex side of the arc faces the center of rotation P of the pneumatic tire 1, which is opposite the protrusion 91*a* illustrated in FIG. 29. The other protrusions 92*b*, 93*b*, 94*b*, 95*b*, 96*b*, 97*b*, and 98*b* have the same configuration as the protrusion 91*b*.

Figure 31:
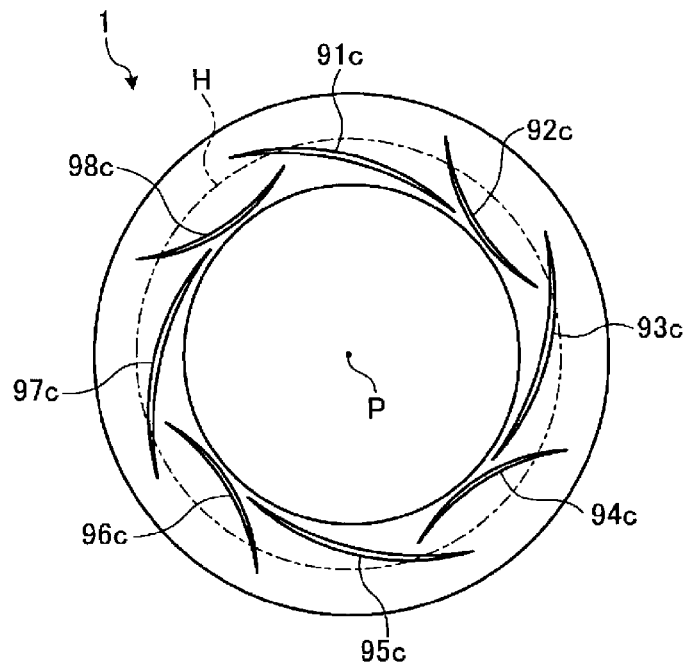
FIG. 31 is a drawing illustrating another arrangement example of the protrusions.

The pneumatic tire 1 illustrated in FIG. 31 includes a plurality of protrusions 91*c*, 92*c*, 93*c*, 94*c*, 95*c*, 96*c*, 97*c*, and 98*c* on the tire side portion S. In this example, spacings between the plurality of protrusions 91*c*, 92*c*, 93*c*, 94*c*, 95*c*, 96*c*, 97*c*, and 98*c* are uniform, that is, equidistant. Moreover, in this example, the plurality of protrusions 91*c*, 92*c*, 93*c*, 94*c*, 95*c*, 96*c*, 97*c*, and 98*c* are arranged in the range SD that includes the tire maximum width position H.

When viewed from the outer side of the vehicle 100 in a direction along the center of rotation (rotation axis) P of the pneumatic tire 1, the protrusions 91*c*, 92*c*, 93*c*, 94*c*, 95*c*, 96*c*, 97*c*, and 98*c* have arc shapes. Moreover, different from the pneumatic tire 1 illustrated in FIG. 29, the protrusions 91*c*, 93*c*, 95*c*, and 97*c* for which the concave side of the arc faces the center of rotation P of the pneumatic tire 1 and the protrusions 92*c*, 94*c*, 96*c*, and 98*c* for which the convex side of the arc faces the center of rotation P of the pneumatic tire 1 are alternately arranged.

Figure 32:
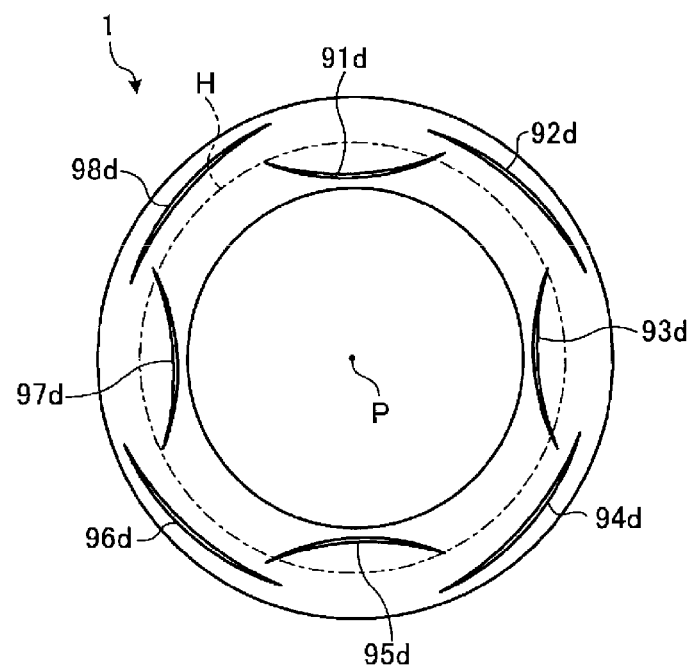
FIG. 32 is a drawing illustrating another arrangement example of the protrusions.

The pneumatic tire 1 illustrated in FIG. 32 includes a plurality of protrusions 91*d*, 92*d*, 93*d*, 94*d*, 95*d*, 96*d*, 97*d*, and 98*d* on the tire side portion S. In this example, spacings between the plurality of protrusions 91*d*, 92*d*, 93*d*, 94*d*, 95*d*, 96*d*, 97*d*, and 98*d* are uniform, that is, equidistant. Moreover, in this example, the plurality of protrusions 91*d*, 92*d*, 93*d*, 94*d*, 95*d*, 96*d*, 97*d*, and 98*d* are arranged in the range SD that includes the tire maximum width position H. Furthermore, different from the pneumatic tire 1 illustrated in FIG. 29, the protrusions 91*d*, 93*d*, 95*d*, and 97*d* for which the convex side of the arc faces the center of rotation P of the pneumatic tire 1 and the protrusions 92*d*, 94*d*, 96*d*, and 98*d* for which the concave side of the arc faces the center of rotation P of the pneumatic tire 1 are alternately arranged. The protrusions 91*d*, 93*d*, 95*d*, and 97*d* for which the convex side of the arc faces the center of rotation P of the pneumatic tire 1 are arranged such that the convex portion of the arc is closer to the center of rotation P of the pneumatic tire 1 than the end portions of the arc. The protrusions 92*d*, 94*d*, 96*d*, and 98*d* for which the concave side of the arc faces the center of rotation P of the pneumatic tire 1 are arranged such that the concave portion of the arc is farther from the center of rotation P of the pneumatic tire 1 than the end portions of the arc.

As described above, the pneumatic tire 1 of the present embodiment includes the plurality of protrusions 9 provided in the range SD that includes the tire maximum width position H of the tire side portion S, the plurality of protrusions 9 extending in a direction intersecting the tire radial direction. In this pneumatic tire 1, the plurality of protrusions 9 are provided separated from each other in the tire circumferential direction by spacings. Additionally, in a case where a first straight line and a second straight line that pass through the center of rotation P of the tire, extend in the tire radial direction, and have different tire circumferential direction positions each cross at least one of the plurality of protrusions, a first protrusion being at least one protrusion, among the plurality of protrusions, the first straight line crosses, and a second protrusion being at least one protrusion, among the plurality of protrusions, the second straight line crosses, the ratio of the sum of the mass(es) per unit length of the first protrusion to the sum of the mass(es) per unit length of the second protrusion is not less than 0.8 and not greater than 1.2.

Additionally, the pneumatic tire 1 of the present embodiment includes the plurality of protrusions 9 provided in the range SD that includes the tire maximum width position H of the tire side portion S, the plurality of protrusions 9 extending in a direction intersecting the tire radial direction. In this pneumatic tire 1, the plurality of protrusions 9 are provided separated from each other in the tire circumferential direction by spacings; and the variation amount in the tire circumferential direction of the mass of the protrusions per 1 degree in the tire circumferential direction is not greater than 0.2 g/degree.

Furthermore, the pneumatic tire 1 of the present embodiment includes the plurality of protrusions 9 provided in the range SD that includes the tire maximum width position H of the tire side portion S, the plurality of protrusions 9 extending in a direction intersecting the tire radial direction. In this pneumatic tire 1, the plurality of protrusions 9 are provided separated from each other in the tire circumferential direction by spacings. Additionally, in a case where a first straight line and a second straight line that pass through the tire rotational center, extend in the tire radial direction, and have different tire circumferential direction positions each cross at least one of the plurality of the protrusions, a first protrusion being at least one protrusion, among the plurality of the protrusions, the first straight line crosses, and a second protrusion being at least one protrusion, among the plurality of the protrusions, the second straight line crosses, the ratio of the sum of area(s) of cross sections along the first straight line of the first protrusion to the sum of area(s) of cross sections along the second straight line of the second protrusion is not less than 0.8 and not greater than 1.2.

According to the pneumatic tire 1 of the present embodiment, due to the protrusions 9 arranged as described above, down force can be increased, air resistance can be reduced and, also, uniformity can be maintained in a good manner.

Note that the spacings in the circumferential direction between the protrusions may be nonuniform, instead of uniform, that is, equidistant. By configuring the spacings in the circumferential direction between the protrusions to be not uniform, the periodicity of the arrangement of the protrusions with respect to the flow of air across the tire side portion will disappear, and noise at specific frequencies can be reduced.

EXAMPLES

In these examples, tests were carried out for steering stability performance (on dry road surfaces), air resistance reducing performance, uniformity, lift reducing performance (down force improving performance), riding comfort, and sound pressure level reducing performance for various types of pneumatic tires under different conditions. The results are shown in Tables 1 and 2.

For the steering stability performance testing, new test tires and test tires at their wear limits were mounted on a regular rim and inflated to a regular internal pressure. Moreover, these test tires were mounted on a passenger vehicle equipped with motor assist and then the vehicle was driven on a dry road surface test course. Steering stability performance improves due to the action of down force and, as such, index evaluations were performed via the riding feeling of the driver. In these index evaluations, the conventional example was used as the reference and was given an index value of 100. In these index evaluations, higher index values indicate superior steering stability performance.

For the uniformity testing, test tires were mounted on a regular rim and inflated to a regular internal pressure. Then, radial force variation (LFV) of the test tires was measured in accordance with the method specified in JASO C607 (Test Procedures for Automobile Tire Uniformity). Index evaluations were performed by expressing the measurement results as index values. In these index evaluations, the conventional example was used as the reference and was given an index value of 100. In these index evaluations, index values of 98 or higher indicate that homogeneity is maintained and uniformity is maintained. Higher index values indicate better homogeneity and superior uniformity.

For the lift reducing performance and air resistance reducing performance testing, a vehicle model simulation was carried out in which the test tires were mounted on a body model of a passenger vehicle equipped with motor assist. In this simulation, a wind tunnel test was performed for a case where traveling at a travel speed equivalent to 80 km/h. Using the aerodynamic resistance coefficient thereof, aerodynamic characteristics were calculated using fluid analysis software based on the lattice Boltzmann method. Index evaluations were performed on the basis of the calculation results. In these index evaluations, the conventional example was used as the reference and was given an index value of 100. In these index evaluations, higher values indicate superior lift reducing performance and superior air resistance reducing performance.

For the riding comfort testing, the test tires were mounted on the test vehicle described above, the test vehicle was actually driven on a straight test course having unevenness with step difference of 10 mm, and feeling tests of the riding comfort were conducted by three panelists. Index evaluations were carried out using the average of the results of three performances of the testing. In these index evaluations, the conventional example was used as the reference and was given an index value of 100. In these index evaluations, index values of 99 or higher indicate that riding comfort is maintained. Higher index values indicate superior riding comfort.

For the sound pressure level reducing performance testing, the test tires were mounted on the test vehicle described above. Sound pressure level (sound pressure level reducing performance) of external noise was measured for a case in which the test vehicle was driven at a travel speed equivalent to 80 km/h. Index evaluations were carried out on the basis of the measurement results. In these index evaluations, the conventional example was used as the reference and was given an index value of 100. In these coefficient evaluations, index values of 99 or higher indicate that sound pressure level reducing performance is maintained. Higher index values indicate superior sound pressure level reducing performance.

In Table 1, the pneumatic tire of the Conventional Example had the tire size recorded in Table 1 and did not include the protrusions. Additionally, the pneumatic tires of Comparative Examples 1 to 3 had the tire sizes recorded in Table 1 and included a plurality of protrusions that pass through the tire maximum width position, extend in a direction orthogonal to the tire radial direction, and for which the cross-sectional shape in the lateral direction is the triangular shape illustrated in FIG. 10. However, the mass ratio of the protrusions was outside the stipulated range.

On the other hand, in Table 1, the pneumatic tires of Examples 1 to 13 had the tire sizes recorded in Table 1 that were within the specified range, had a form such as that illustrated in FIG. 8, and included a plurality of protrusions that pass through the tire maximum width position, extend in a direction orthogonal to the tire radial direction, and for which the cross-sectional shape in the lateral direction is the triangular shape illustrated in FIG. 10. Moreover, the mass ratio of the protrusions satisfied the given specifications. In addition, the pneumatic tires of Examples 1 to 13 satisfied the specifications for overlapping in the tire radial direction of the protrusions, the protruding height in the extending direction of the protrusions, the width in the extending direction of the protrusions, the mass variation of the protrusions per 1 degree in the tire circumferential direction, the presence or absence of the grooves, the presence or absence of the dimples, the spacings between the protrusions, the arrangement when mounted on the vehicle, and the like.

Additionally, in Table 2, the pneumatic tire of the Conventional Example had the tire size recorded in Table 2 and did not include the protrusions. Additionally, the pneumatic tires of Comparative Examples 4 to 6 had the tire sizes recorded in Table 2 and included a plurality of protrusions that pass through the tire maximum width position, extend in a direction orthogonal to the tire radial direction, and for which the cross-sectional shape in the lateral direction is the triangular shape illustrated in FIG. 10. However, the cross-sectional area ratio of the protrusions was outside the stipulated range.

On the other hand, in Table 2, the pneumatic tires of Examples 14 to 26 had the tire sizes recorded in Table 2 that were within the specified range, had a form such as that illustrated in FIG. 8, and included a plurality of protrusions that pass through the tire maximum width position, extend in a direction orthogonal to the tire radial direction, and for which the cross-sectional shape in the lateral direction is the triangular shape illustrated in FIG. 10. Moreover, the cross-sectional area ratio of the protrusions satisfied the given specifications. In addition, the pneumatic tires of Examples 14 to 26 satisfied the specifications for overlapping in the tire radial direction of the protrusions, the protruding height in the extending direction of the protrusions, the width in the extending direction of the protrusions, the mass variation of the protrusions per 1 degree in the tire circumferential direction, the presence or absence of the grooves, the presence or absence of the dimples, the spacings between the protrusions, the arrangement when mounted on the vehicle, and the like.

As shown in the test results of Tables 1 and 2, it is clear that, with the pneumatic tires of the Examples, steering stability performance, air resistance reducing performance, uniformity, lift reducing performance, riding comfort, and sound pressure level reducing performance were maintained or improved.

TABLE 1

|  | Conventional Example | Comparative Example 1 | Comparative Example 2 | Comparative Example 3 |
|---|---|---|---|---|
| Presence/absence of protrusions | Absent | Present | Present | Present |
| Protrusion position | — | Passes through maximum width | Passes through maximum width | Passes through maximum width |
| Overlap of protrusions in tire radial direction | — | No | No | No |
| Height of protrusions in extending direction | — | Same | Same | Same |
| Width of protrusions in extending direction | — | Same | Same | Same |
| Mass ratio | — | Non-identical | 0.7 | 1.3 |
| Mass variation per 1 degree in tire circumferential direction of protrusions (g) | — | 0.4 | 0.4 | 0.4 |
| Presence/absence of grooves | — | Absent | Absent | Absent |
| Presence/absence of dimples | — | Absent | Absent | Absent |
| Spacing between protrusions | — | Uniform | Uniform | Uniform |
| Arrangement when mounted on vehicle | — | Vehicle Outer Side | Vehicle Outer Side | Vehicle Outer Side |
| Steering stability | 100 | 101 | 103 | 103 |
| Air resistance reducing performance | 100 | 98 | 100 | 100 |
| Uniformity | 100 | 97 | 97 | 97 |
| Lift reducing performance | 100 | 101 | 103 | 103 |
| Riding comfort | 100 | 99 | 99 | 99 |
| Sound pressure level reducing performance | 100 | 99 | 99 | 99 |

|  | Example 1 | Example 2 | Example 3 | Example 4 |
|---|---|---|---|---|
| Presence/absence of protrusions | Present | Present | Present | Present |
| Protrusion position | Passes through maximum width | Passes through maximum width | Passes through maximum width | Passes through maximum width |
| Overlap of protrusions in tire radial direction | No | Yes | Yes | Yes |
| Height of protrusions in extending direction | Same | Tip portion low | Tip portion low | Tip portion low |
| Width of protrusions in extending direction | Same | Same | Same | Same |
| Mass ratio | 0.8 | 0.8 | 1.2 | 1.0 |
| Mass variation per 1 degree in tire circumferential direction of protrusions (g) | 0.4 | 0.3 | 0.3 | 0.3 |
| Presence/absence of grooves | Absent | Absent | Absent | Absent |
| Presence/absence of dimples | Absent | Absent | Absent | Absent |
| Spacing between protrusions | Uniform | Uniform | Uniform | Uniform |
| Arrangement when mounted on vehicle | Vehicle Outer Side | Vehicle Outer Side | Vehicle Outer Side | Vehicle Outer Side |
| Steering stability | 103 | 103 | 103 | 103 |
| Air resistance reducing performance | 100 | 100 | 100 | 100 |
| Uniformity | 98 | 98 | 98 | 99 |
| Lift reducing performance | 103 | 103 | 103 | 103 |
| Riding comfort | 99 | 99 | 99 | 99 |
| Sound pressure level reducing performance | 99 | 99 | 99 | 99 |

|  | Example 5 | Example 6 | Example 7 | Example 8 | Example 9 |
|---|---|---|---|---|---|
| Presence/absence of protrusions | Present | Present | Present | Present | Present |
| Protrusion position | Passes through maximum width | Passes through maximum width | Passes through maximum width | Passes through maximum width | Passes through maximum width |
| Overlap of protrusions in tire radial direction | Yes | Yes | Yes | Yes | Yes |
| Height of protrusions in extending direction | Same | Tip portion low | Tip portion low | Tip portion low | Tip portion low |

TABLE 1-continued

| | | | | | |
|---|---|---|---|---|---|
| Width of protrusions in extending direction | Tip portion narrow | Tip portion narrow | Tip portion narrow | Tip portion narrow | Tip portion narrow |
| Mass ratio | 1.0 | 1.0 | 1.0 | 1.0 | 1.0 |
| Mass variation per 1 degree in tire circumferential direction of protrusions (g) | 0.3 | 0.3 | 0.2 | 0.2 | 0.2 |
| Presence/absence of grooves | Absent | Absent | Absent | Present | Absent |
| Presence/absence of dimples | Absent | Absent | Absent | Absent | Present |
| Spacing between protrusions | Uniform | Uniform | Uniform | Uniform | Uniform |
| Arrangement when mounted on vehicle | Vehicle Outer Side | Vehicle Outer Side | Vehicle Outer Side | Vehicle Outer Side | Vehicle Outer Side |
| Steering stability | 103 | 103 | 103 | 103 | 103 |
| Air resistance reducing performance | 100 | 100 | 100 | 100 | 100 |
| Uniformity | 99 | 99 | 100 | 100 | 100 |
| Lift reducing performance | 103 | 103 | 103 | 103 | 103 |
| Riding comfort | 99 | 99 | 99 | 99.5 | 99.5 |
| Sound pressure level reducing performance | 99 | 99 | 99 | 99 | 99 |

| | Example 10 | Example 11 | Example 12 | Example 13 |
|---|---|---|---|---|
| Presence/absence of protrusions | Present | Present | Present | Present |
| Protrusion position | Passes through maximum width | Passes through maximum width | Passes through maximum width | Passes through maximum width |
| Overlap of protrusions in tire radial direction | Yes | Yes | Yes | Yes |
| Height of protrusions in extending direction | Tip portion low | Tip portion low | Tip portion low | Tip portion low |
| Width of protrusions in extending direction | Tip portion narrow | Tip portion narrow | Tip portion narrow | Tip portion narrow |
| Mass ratio | 1.0 | 1.0 | 1.0 | 1.0 |
| Mass variation per 1 degree in tire circumferential direction of protrusions (g) | 0.2 | 0.2 | 0.2 | 0.2 |
| Presence/absence of grooves | Present | Present | Present | Present |
| Presence/absence of dimples | Present | Present | Present | Present |
| Spacing between protrusions | Uniform | Non-uniform | Non-uniform | Non-uniform |
| Arrangement when mounted on vehicle | Vehicle Outer Side | Vehicle Outer Side | Vehicle Inner Side | Vehicle Outer Side Vehicle Inner Side |
| Steering stability | 103 | 103 | 103 | 103 |
| Air resistance reducing performance | 100 | 100 | 100 | 100 |
| Uniformity | 100 | 100 | 100 | 100 |
| Lift reducing performance | 103 | 103 | 103 | 103 |
| Riding comfort | 100 | 100 | 100 | 100 |
| Sound pressure level reducing performance | 99 | 100 | 100 | 100 |

TABLE 2

| | Conventional Example | Comparative Example 4 | Comparative Example 5 | Comparative Example 6 |
|---|---|---|---|---|
| Presence/absence of protrusions | Absent | Present | Present | Present |
| Protrusion position | — | Passes through maximum width | Passes through maximum width | Passes through maximum width |
| Overlap of protrusions in tire radial direction | — | No | No | No |
| Height of protrusions in extending direction | — | Same | Same | Same |
| Width of protrusions in extending direction | — | Same | Same | Same |
| Cross-sectional area ratio | — | Non-identical | 0.7 | 1.3 |
| Mass variation per 1 degree in tire circumferential direction of protrusions (g) | — | 0.4 | 0.4 | 0.4 |

TABLE 2-continued

|  |  | | | |
|---|---|---|---|---|
| Presence/absence of grooves | — | Absent | Absent | Absent |
| Presence/absence of dimples | — | Absent | Absent | Absent |
| Spacing between protrusions | — | Uniform | Uniform | Uniform |
| Arrangement when mounted on vehicle | — | Vehicle Outer Side | Vehicle Outer Side | Vehicle Outer Side |
| Steering stability | 100 | 101 | 103 | 103 |
| Air resistance reducing performance | 100 | 98 | 100 | 100 |
| Uniformity | 100 | 97 | 97 | 97 |
| Lift reducing performance | 100 | 101 | 103 | 103 |
| Riding comfort | 100 | 99 | 99 | 99 |
| Sound pressure level reducing performance | 100 | 99 | 99 | 99 |

|  | Example 14 | Example 15 | Example 16 | Example 17 |
|---|---|---|---|---|
| Presence/absence of protrusions | Present | Present | Present | Present |
| Protrusion position | Passes through maximum width | Passes through maximum width | Passes through maximum width | Passes through maximum width |
| Overlap of protrusions in tire radial direction | No | Yes | Yes | Yes |
| Height of protrusions in extending direction | Same | Tip portion low | Tip portion low | Tip portion low |
| Width of protrusions in extending direction | Same | Same | Same | Same |
| Cross-sectional area ratio | 0.8 | 0.8 | 1.2 | 1.0 |
| Mass variation per 1 degree in tire circumferential direction of protrusions (g) | 0.4 | 0.3 | 0.3 | 0.3 |
| Presence/absence of grooves | Absent | Absent | Absent | Absent |
| Presence/absence of dimples | Absent | Absent | Absent | Absent |
| Spacing between protrusions | Uniform | Uniform | Uniform | Uniform |
| Arrangement when mounted on vehicle | Vehicle Outer Side | Vehicle Outer Side | Vehicle Outer Side | Vehicle Outer Side |
| Steering stability | 103 | 103 | 103 | 103 |
| Air resistance reducing performance | 100 | 100 | 100 | 100 |
| Uniformity | 98 | 98 | 98 | 99 |
| Lift reducing performance | 103 | 103 | 103 | 103 |
| Riding comfort | 99 | 99 | 99 | 99 |
| Sound pressure level reducing performance | 99 | 99 | 99 | 99 |

|  | Example 18 | Example 19 | Example 20 | Example 21 | Example 22 |
|---|---|---|---|---|---|
| Presence/absence of protrusions | Present | Present | Present | Present | Present |
| Protrusion position | Passes through maximum width | Passes through maximum width | Passes through maximum width | Passes through maximum width | Passes through maximum width |
| Overlap of protrusions in tire radial direction | Yes | Yes | Yes | Yes | Yes |
| Height of protrusions in extending direction | Same | Tip portion low | Tip portion low | Tip portion low | Tip portion low |
| Width of protrusions in extending direction | Tip portion narrow | Tip portion narrow | Tip portion narrow | Tip portion narrow | Tip portion narrow |
| Cross-sectional area ratio | 1.0 | 1.0 | 1.0 | 1.0 | 1.0 |
| Mass variation per 1 degree in tire circumferential direction of protrusions (g) | 0.3 | 0.3 | 0.2 | 0.2 | 0.2 |
| Presence/absence of grooves | Absent | Absent | Absent | Present | Absent |
| Presence/absence of dimples | Absent | Absent | Absent | Absent | Present |
| Spacing between protrusions | Uniform | Uniform | Uniform | Uniform | Uniform |
| Arrangement when mounted on vehicle | Vehicle Outer Side | Vehicle Outer Side | Vehicle Outer Side | Vehicle Outer Side | Vehicle Outer Side |
| Steering stability | 103 | 103 | 103 | 103 | 103 |
| Air resistance reducing performance | 100 | 100 | 100 | 100 | 100 |
| Uniformity | 99 | 99 | 100 | 100 | 100 |
| Lift reducing performance | 103 | 103 | 103 | 103 | 103 |
| Riding comfort | 99 | 99 | 99 | 99.5 | 99.5 |
| Sound pressure level reducing performance | 99 | 99 | 99 | 99 | 99 |

TABLE 2-continued

|  | Example 23 | Example 24 | Example 25 | Example 26 |
|---|---|---|---|---|
| Presence/absence of protrusions | Present | Present | Present | Present |
| Protrusion position | Passes through maximum width | Passes through maximum width | Passes through maximum width | Passes through maximum width |
| Overlap of protrusions in tire radial direction | Yes | Yes | Yes | Yes |
| Height of protrusions in extending direction | Tip portion low | Tip portion low | Tip portion low | Tip portion low |
| Width of protrusions in extending direction | Tip portion narrow | Tip portion narrow | Tip portion narrow | Tip portion narrow |
| Cross-sectional area ratio | 1.0 | 1.0 | 1.0 | 1.0 |
| Mass variation per 1 degree in tire circumferential direction of protrusions (g) | 0.2 | 0.2 | 0.2 | 0.2 |
| Presence/absence of grooves | Present | Present | Present | Present |
| Presence/absence of dimples | Present | Present | Present | Present |
| Spacing between protrusions | Uniform | Non-uniform | Non-uniform | Non-uniform |
| Arrangement when mounted on vehicle | Vehicle Outer Side | Vehicle Outer Side | Vehicle Inner Side | Vehicle Outer Side Vehicle Inner Side |
| Steering stability | 103 | 103 | 103 | 103 |
| Air resistance reducing performance | 100 | 100 | 100 | 100 |
| Uniformity | 100 | 100 | 100 | 100 |
| Lift reducing performance | 103 | 103 | 103 | 103 |
| Riding comfort | 100 | 100 | 100 | 100 |
| Sound pressure level reducing performance | 99 | 100 | 100 | 100 |

The invention claimed is:

1. A pneumatic tire, comprising:
a plurality of protrusions provided in a range that includes a tire maximum width position of a tire side portion, the plurality of protrusions extending in a direction intersecting a tire radial direction; wherein
the plurality of protrusions are provided separated from each other in a tire circumferential direction by spacings, in a case where a first straight line and a second straight line that pass through a tire rotational center, extend in the tire radial direction, and have different tire circumferential direction positions each cross at least one of the plurality of the protrusions, a first protrusion being at least one protrusion, among the plurality of protrusions, the first straight line crosses, and a second protrusion being at least one protrusion, among the plurality of protrusions, the second straight line crosses,
a ratio of a sum of mass(es) per unit length of the protrusions the first straight line crosses to a sum of mass(es) per unit length of the protrusions the second straight line crosses is not less than 0.8 and not greater than 1.2,
a center portion is defined as a portion extending 25% of a length of the protrusion from a middle of the length of the protrusion, toward both sides in an extending direction of the protrusion,
an entirety of the center portion is disposed inward of the tire maximum width position in the tire radial direction,
a protruding height from a tire side surface decreases gradually from the middle toward both end portions in the extending direction,
in a side view of a direction orthogonal to a longitudinal direction of the protrusion, the protruding height at the center portion continuously changes from a highest position to a lowest position, and
the protrusions adjacent to each other in the tire circumferential direction overlap each other in view of the tire radial direction.

2. A pneumatic tire, comprising:
a plurality of protrusions provided in a range that includes a tire maximum width position of a tire side portion, the plurality of protrusions extending in a direction intersecting a tire radial direction; wherein
the plurality of protrusions are provided separated from each other in a tire circumferential direction by spacings,
a variation amount in the tire circumferential direction of a mass of the protrusions per 1 degree in the tire circumferential direction is not greater than 0.2 g/degree,
a center portion is defined as a portion extending 25% of a length of the protrusions from a middle of the length of the protrusions, toward both sides in an extending direction of the protrusion,
an entirety of the center portion is disposed inward of the tire maximum width position in the tire radial direction,
a protruding height from a tire side surface decreases gradually from the middle toward both end portions in the extending direction,
in a side view of a direction orthogonal to a longitudinal direction of the protrusion, a height of the center portion continuously changes from a highest position to a lowest position, and
the protrusions adjacent to each other in the tire circumferential direction overlap each other in view of the tire radial direction.

3. A pneumatic tire, comprising:
a plurality of protrusions provided in a range that includes a tire maximum width position of a tire side portion, the plurality of protrusions extending in a direction intersecting a tire radial direction; wherein
the plurality of protrusions are provided separated from each other in a tire circumferential direction by spacings, in a case where a first straight line and a second straight line that pass through a tire rotational center, extend in the tire radial direction, and have different tire circumferential direction positions each cross at least one of the plurality of the protrusions, a first protrusion being at least one protrusion, among the plurality of the protrusions, the first straight line crosses, and a second protrusion being at least one protrusion, among the plurality of the protrusions, the second straight line crosses, a ratio of a sum of area(s) of cross section(s) of the protrusions the first straight line crosses to a sum of area(s) of cross section(s) of the protrusions the second straight line crosses is not less than 0.8 and not greater than 1.2, a center portion is defined as a portion extending 25% of a length of the protrusion from a middle of the length of the protrusion, toward both sides in an extending direction of the protrusion, an entirety of the center portion is disposed inward of the tire maximum width position in the tire radial direction, a protruding height from a tire side surface decreases gradually from the middle toward both end portions in the extending direction, in a side view of a direction orthogonal to a longitudinal direction of the protrusion, a height of the center portion continuously changes from a highest position to a lowest position, and the protrusions adjacent to each other in the tire circumferential direction overlap each other in view of the tire radial direction.

4. The pneumatic tire according to claim 1, wherein:
the first straight line crosses no less than two of the protrusions; and
the second straight line crosses a singular number of the protrusions.

5. The pneumatic tire according to claim 1, wherein:
the protruding height at a central portion of the protrusions is greater than the protruding height at both end portions of the protrusions.

6. The pneumatic tire according to claim 1, wherein:
a width of a central portion of the protrusions is greater than a width of both end portions of the protrusions.

7. The pneumatic tire according to claim 1, wherein:
the protrusions pass through the tire maximum width position.

8. The pneumatic tire according to claim 1, wherein:
at least one of the plurality of protrusions includes a groove.

9. The pneumatic tire according to claim 8, wherein:
a depth of the groove is not less than 5% and not greater than 80% of the protruding height at a portion of the protrusion where the groove is provided.

10. The pneumatic tire according to claim 1, wherein:
the protrusions are provided on the tire side portion on an outer side of a vehicle on which a tire is to be mounted.

11. The pneumatic tire according to claim 1, wherein:
at least one of the plurality of protrusions includes a dimple.

12. The pneumatic tire according to claim 1, wherein:
the spacings in the tire circumferential direction between the protrusions are not uniform.

13. The pneumatic tire according to claim 1, wherein:
the tire has a designation indicating a vehicle inner side/outer side orientation when mounted on a vehicle; and the protrusions are formed on at least the tire side portion that becomes the vehicle outer side.

14. A vehicle, comprising the pneumatic tire according to claim 1.

15. The pneumatic tire according to claim 2, wherein:
a height of a central portion of the protrusions is greater than a height of both end portions of the protrusions.

16. The pneumatic tire according to claim 2, wherein:
a width of a central portion of the protrusions is greater than a width of both end portions of the protrusions.

17. The pneumatic tire according to claim 3, wherein:
the first straight line crosses no less than two of the protrusions; and
the second straight line crosses a singular number of the protrusions.

18. The pneumatic tire according to claim 3, wherein:
a height of a central portion of the protrusions is greater than a height of both end portions of the protrusions.

19. The pneumatic tire according to claim 3, wherein:
a width of a central portion of the protrusions is greater than a width of both end portions of the protrusions.

20. The pneumatic tire according to claim 1, wherein, in a side view of a direction orthogonal to a longitudinal direction of the protrusion, both end portions of a profile of the protrusion are connected to a surface of the tire side portion and the profile from one of the end portions to a maximum position of the protruding height of the protrusion has an arc-like shape.

21. The pneumatic tire according to claim 1, wherein an overlapping length of the protrusions is not less than 20 percent to not more than 60 percent of a length in extending direction of the protrusion.

22. The pneumatic tire according to claim 1, wherein in a side view of a direction orthogonal to a longitudinal direction of the protrusion, both end portions of a profile of the protrusion are connected to the tire side surface and the profile from one of the end portions to a maximum position of the protruding height of the protrusion has a single arc-like shape that has a convex toward outward of the profile.

23. A pneumatic tire, comprising:
a plurality of protrusions provided in a range that includes a tire maximum width position of a tire side portion, the plurality of protrusions extending in a direction intersecting a tire radial direction; wherein
the plurality of protrusions are provided separated from each other in a tire circumferential direction by spacings, in a case where a first straight line and a second straight line that pass through a tire rotational center, extend in the tire radial direction, and have different tire circumferential direction positions each cross at least one of the plurality of the protrusions, a first protrusion being at least one protrusion, among the plurality of protrusions, the first straight line crosses, and a second protrusion being at least one protrusion, among the plurality of protrusions, the second straight line crosses, a ratio of a sum of mass(es) per unit length of the protrusions the first straight line crosses to a sum of mass(es) per unit length of the protrusions the second straight line crosses is not less than 0.8 and not greater than 1.2, a center portion is defined as a portion extending 25% of a length of the protrusion from a middle of the length of the protrusion, toward both sides in an extending direction of the protrusion, an entirety of the center portion is disposed inward of the tire maximum width position in the tire radial direction, a protruding height from a tire side surface decreases gradually from the middle toward both end portions in the extending direction, in a side view of a direction orthogonal to a longitudinal direction of the protrusion, the protruding height at the center portion continuously changes from a highest position to a lowest position, and an innermost end portion and an outermost end portion of the protrusion in the tire radial direction are disposed at different positions in the tire circumferential direction.

24. The pneumatic tire according to claim 23, wherein in a side view of a direction orthogonal to a longitudinal direction of the protrusion, both end portions of a profile of the protrusion are connected to the tire side surface and the profile from one of the end portions to a maximum position of the protruding height of the protrusion has a single arc-like shape that has a convex toward outward of the profile.

25. The pneumatic tire according to claim 1, wherein the protrusions have a shape defined by a connected pair of arcs when viewed in a side view of the pneumatic tire, each arc of the pair of arcs having a different curvature from each other, wherein respective ends of each arc are connected to each other and the pair of arcs protrude in a same direction.

26. A pneumatic tire, comprising:
a plurality of protrusions provided in a range that includes a tire maximum width position of a tire side portion, the plurality of protrusions extending in a direction intersecting a tire radial direction; wherein the plurality of protrusions are provided separated from each other in a tire circumferential direction by spacings, in a case where a first straight line and a second straight line that pass through a tire rotational center, extend in the tire radial direction, and have different tire circumferential direction positions each cross at least one of the plurality of the protrusions, a first protrusion being at least one protrusion, among the plurality of protrusions, the first straight line crosses, and a second protrusion being at least one protrusion, among the plurality of protrusions, the second straight line crosses, a ratio of a sum of area(s) of cross section(s) of the protrusions the first straight line crosses to a sum of area(s) of cross section(s) of the protrusions the second straight line crosses is not less than 0.8 and not greater than 1.2, a center portion is defined as a portion extending 25% of a length of the protrusion from a middle of the length of the protrusion, toward both sides in an extending direction of the protrusion, a protruding height from a tire side surface decreases gradually from the middle toward both end portions in the extending direction, a variation amount in the tire circumferential direction of a mass of the protrusions per 1 degree in the tire circumferential direction is not greater than 0.2 g/degree, a ratio of a sum of area(s) of cross section(s) along the first straight line of the first protrusion to a sum of area(s) of cross section(s) along the second straight line of the second protrusion is not less than 0.8 and not greater than 1.2, in a side view of a direction orthogonal to a longitudinal direction of the protrusion, the protruding height at the center portion continuously changes from a highest position to a lowest position, and the protrusions adjacent to each other in the tire circumferential direction overlap each other in view of the tire radial direction.

27. The pneumatic tire according to claim 1, wherein a width of the protrusion in a lateral direction is greatest at the highest position of the projection height and smallest at the lowest position of the projection height.

* * * * *